US011092681B2

(12) United States Patent
Nagai et al.

(10) Patent No.: US 11,092,681 B2
(45) Date of Patent: Aug. 17, 2021

(54) UNDERWATER DETECTION APPARATUS AND UNDERWATER DETECTION METHOD

(71) Applicant: FURUNO ELECTRIC CO., LTD., Nishinomiya (JP)

(72) Inventors: Sanae Nagai, Nishinomiya (JP); Roger Saetre, Alesund (NO)

(73) Assignee: FURUNO ELECTRIC COMPANY LIMITED, Nishinomiya (JP)

( * ) Notice: Subject to any disclaimer, the term of this patent is extended or adjusted under 35 U.S.C. 154(b) by 258 days.

(21) Appl. No.: 16/406,804

(22) Filed: May 8, 2019

(65) Prior Publication Data

US 2020/0271768 A1    Aug. 27, 2020

(30) Foreign Application Priority Data

May 14, 2018 (GB) ..................... 1807810

(51) Int. Cl.
| | |
|---|---|
| *G01S 7/62* | (2006.01) |
| *G01S 15/42* | (2006.01) |
| *G01S 15/89* | (2006.01) |

(52) U.S. Cl.
CPC ............ *G01S 7/6263* (2013.01); *G01S 15/42* (2013.01); *G01S 15/8902* (2013.01)

(58) Field of Classification Search
None
See application file for complete search history.

(56) References Cited

U.S. PATENT DOCUMENTS

| | | |
|---|---|---|
| 5,805,528 A | 9/1998 | Hamada et al. |
| 7,898,902 B2 | 3/2011 | Sloss |
| 2016/0018516 A1 | 1/2016 | Brown et al. |

FOREIGN PATENT DOCUMENTS

| | | |
|---|---|---|
| EP | 1 218 696 B1 | 2/2009 |
| GB | 2 430 743 B | 3/2009 |
| JP | 2009-069164 A | 4/2009 |
| JP | 2009-178120 A | 8/2009 |

(Continued)

OTHER PUBLICATIONS

Wassp, WASSP WMB-160F: Profiling a Shipwreck, https://www.youtube.com/watch?v=bDIEmUalm2A (Year: 2012).*

(Continued)

*Primary Examiner* — Hovhannes Baghdasaryan
(74) *Attorney, Agent, or Firm* — Studebaker & Brackett PC

(57) ABSTRACT

An underwater detection apparatus is provided. The underwater detection apparatus includes a transmission and reception circuit, and processing circuitry. The transmission and reception circuit drives a transmission transducer to transmit a transmission wave and generates a reception signal based on a reflection wave including a reflection of the transmission wave on an underwater target. The processing circuitry acquires a water bottom depth, sets a boundary passing at a point having a depth equal to the water bottom depth, the boundary making a given angle with a horizontal direction, and generates an image data that represents a location of the underwater target based at least in part on the reception signal, the image data including a color information, the color information being set based at least in part on the location of the underwater target relative to the boundary.

16 Claims, 16 Drawing Sheets

2D IMAGE AFTER BOUNDARY PROCESSING

(56) References Cited

FOREIGN PATENT DOCUMENTS

JP          4491496 B2     6/2010

OTHER PUBLICATIONS

United Kingdom Search Report issued in GB 1807810.5 by the Intellectual Property Office dated Oct. 17, 2018.
Furuno Electric Co., LTD.; "Multi Beam Sonar"; Operator's Manual; Model: DFF-3D; Pub. No. OME-13520-D1.
WASSP Ltd.; "Multibeam: WMB-3230"; Operator Manual; Doc. P/N: WSP-009-008; Version: V1.3; Issue Date: Apr. 2014.
Simrad; "Simrad TD50: 3D Visualization Software"; Reference Manual; Release 1.3.x; Nov. 30, 2017.

* cited by examiner

2D IMAGE BEFORE BOUNDARY PROCESSING

2D IMAGE AFTER BOUNDARY PROCESSING

SIDE VIEW
AFTER BOUNDARY PROCESSING

3D IMAGE AFTER BOUNDARY PROCESSING

UNDERWATER DETECTION APPARATUS AND UNDERWATER DETECTION METHOD

CROSS-REFERENCE TO RELATED APPLICATION(S)

This application claims priority under 35 U.S.C. § 119 to United Kingdom Patent Application No. 1807810.5, which was filed on May 14, 2018, the entire disclosure of which is hereby incorporated by reference.

TECHNICAL FIELD

The present disclosure relates to an underwater detection apparatus and an underwater detection method, which detect a target underwater.

BACKGROUND

Three dimensional (3D) sonars are generally known as underwater detection apparatuses. The 3D sonar transmits a beam by a transmission element and receives an echo thereof by a reception element. The 3D sonar also processes a reception signal obtained by the echo reception to display an underwater target in a 3D image. Typical 3D sonar is configured to detect a seabed surface and display it in multi tone (multiple colors).

However, with the above configuration, the 3D sonar needs to distinguish the seabed surface, which increases its calculation load. Moreover, a school of fish near the seabed (i.e., school of demersal fish) may erroneously be recognized as the seabed and displayed in a color used for the seabed, causing a difficulty in differentiating it from the seabed.

SUMMARY

One purpose of this disclosure is directed to providing an underwater detection apparatus and an underwater detection method, which display a water bottom surface with simpler processing.

Another purpose of this disclosure is directed to providing an underwater detection apparatus and an underwater detection method, which easily differentiate a school of demersal fish conventionally determined as a seabed in a seabed detection from the seabed on an echo image.

In order to solve the above problems, according to one aspect of this disclosure, an underwater detection apparatus is provided, which may include a transmission and reception circuit, and processing circuitry. The transmission and reception circuit may drive a transmission transducer to transmit a transmission wave and may generate a reception signal based on a reflection wave including a reflection of the transmission wave on an underwater target. The processing circuitry may acquire a water bottom depth, set a boundary passing at a point having a depth equal to the water bottom depth, the boundary making a given angle with a horizontal direction, and generate an image data that represents a location of the underwater target based at least in part on the reception signal, the image data including a color information, the color information being set based at least in part on the location of the underwater target relative to the boundary.

In order to solve the above problems, according to another aspect of this disclosure, an underwater detection method is provided, which may include driving a transmission transducer to transmit a transmission wave, generating a reception signal based on a reflection wave comprising a reflection of the transmission wave on an underwater target, acquiring a water bottom depth, setting a boundary passing at a point having a depth equal to the water bottom depth, the boundary making a given angle with a horizontal direction, and generating an image data that represents a location of the underwater target based at least in part on the reception signal, the image data including a color information, the color information being set based at least in part on the location of the underwater target relative to the boundary.

According to this disclosure, a water bottom surface may be displayed with simpler processing. Further, a school of demersal fish which is conventionally determined as a seabed in a seabed detection may easily be differentiated from the seabed on an echo image.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

Hereinafter, an underwater detection apparatus 1 according to one embodiment of this disclosure is described with reference to the accompanying drawings. In the following embodiment, an example is illustrated in which this disclosure is applied to a ship. However, the present disclosure may be applied to any kinds of vehicles having a rudder or a similar steering device, such as other watercrafts including boats (fishing boats), vessels, and submarines.

[Configuration of Underwater Detection Apparatus]

Figure 1:
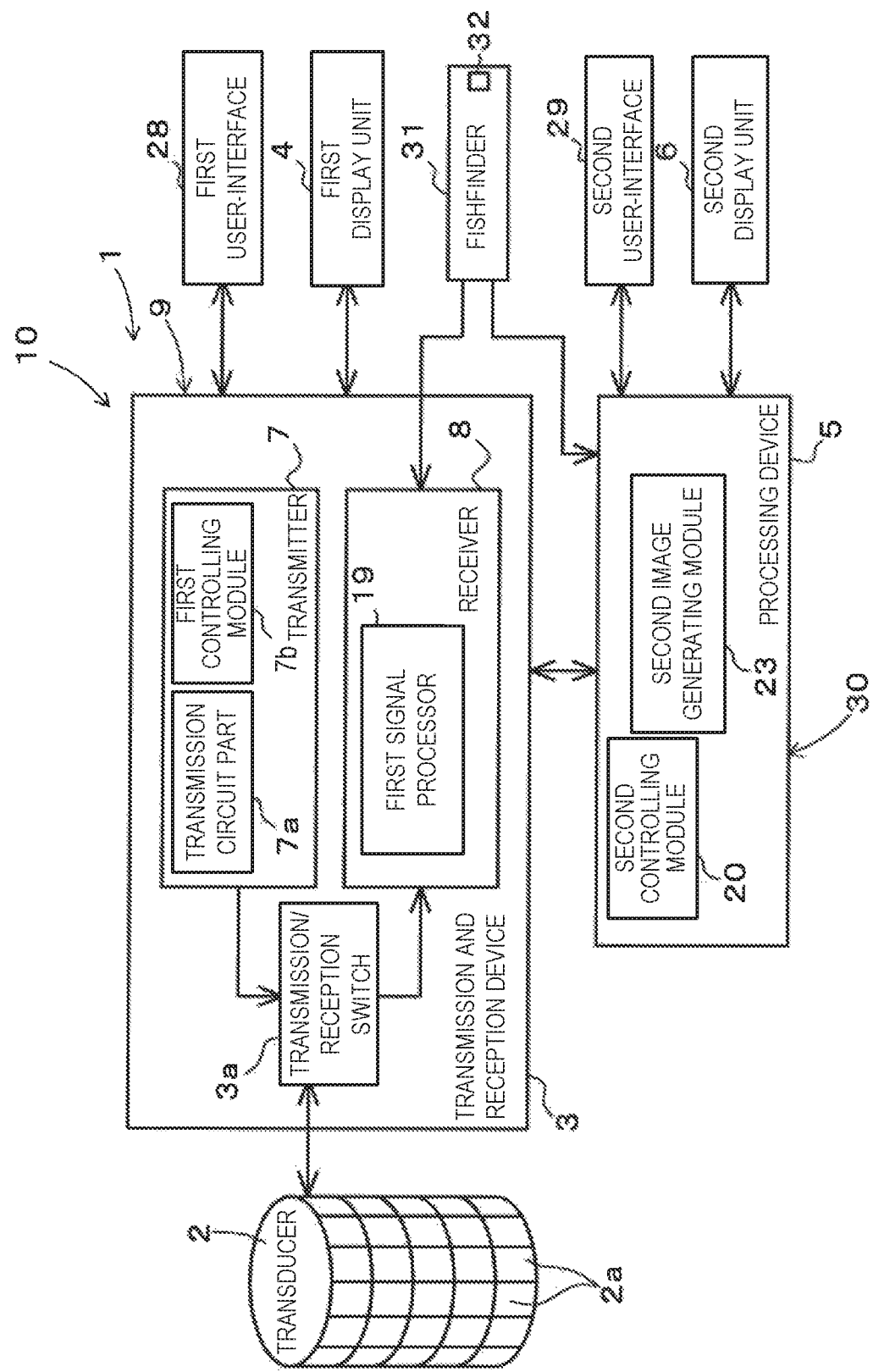
FIG. 1 is a block diagram illustrating a configuration of an underwater detection apparatus according to one embodiment of this disclosure.

FIG. 1 is a block diagram illustrating a configuration of the underwater detection apparatus 1 of the embodiment of this disclosure. Below, a ship equipped with the underwater detection apparatus 1 may be referred to as "the ship." Note that FIG. 1 only illustrates some of components constituting a receiver 8 and a processing device 5.

As illustrated in FIG. 1, the underwater detection apparatus 1 of this embodiment may include a scanning sonar 10, the processing device 5, and a second display unit 6. The scanning sonar 10 may be a general scanning sonar, and the underwater detection apparatus 1 may be configured by externally attaching the processing device 5, the second display unit 6 and a second user-interface 29 comprised of a keyboard, a mouse, etc., to the scanning sonar 10.

The scanning sonar 10 may include a transducer 2 (which may also be referred to as a transmission transducer or a reception transducer), a transmission and reception device 3 (which may also be referred to as a transmission and reception circuit), a first display unit 4, and a first user-interface 28.

The transducer 2 may have a function to transmit and receive ultrasonic waves and be attached to a bottom of the ship. For example, the transducer 2 may have a substantially cylindrical shape and be arranged so that its axial direction is in the vertical plane and its radial directions are parallel to horizontal directions.

For example, the transducer 2 may include a substantially cylindrical casing and ultrasonic transducers 2a as a plurality of transducer elements attached to an outer circumferential surface of the casing. Each ultrasonic transducer 2a may transmit an ultrasonic wave underwater, receive an echo, convert the echo into an electric signal, and output it to the receiver 8. Note that, although in this embodiment the casing of the transducer 2 has the cylindrical shape, without particularly limiting to this, other shapes may also be adopted, for example, a spherical shape.

Figure 2:
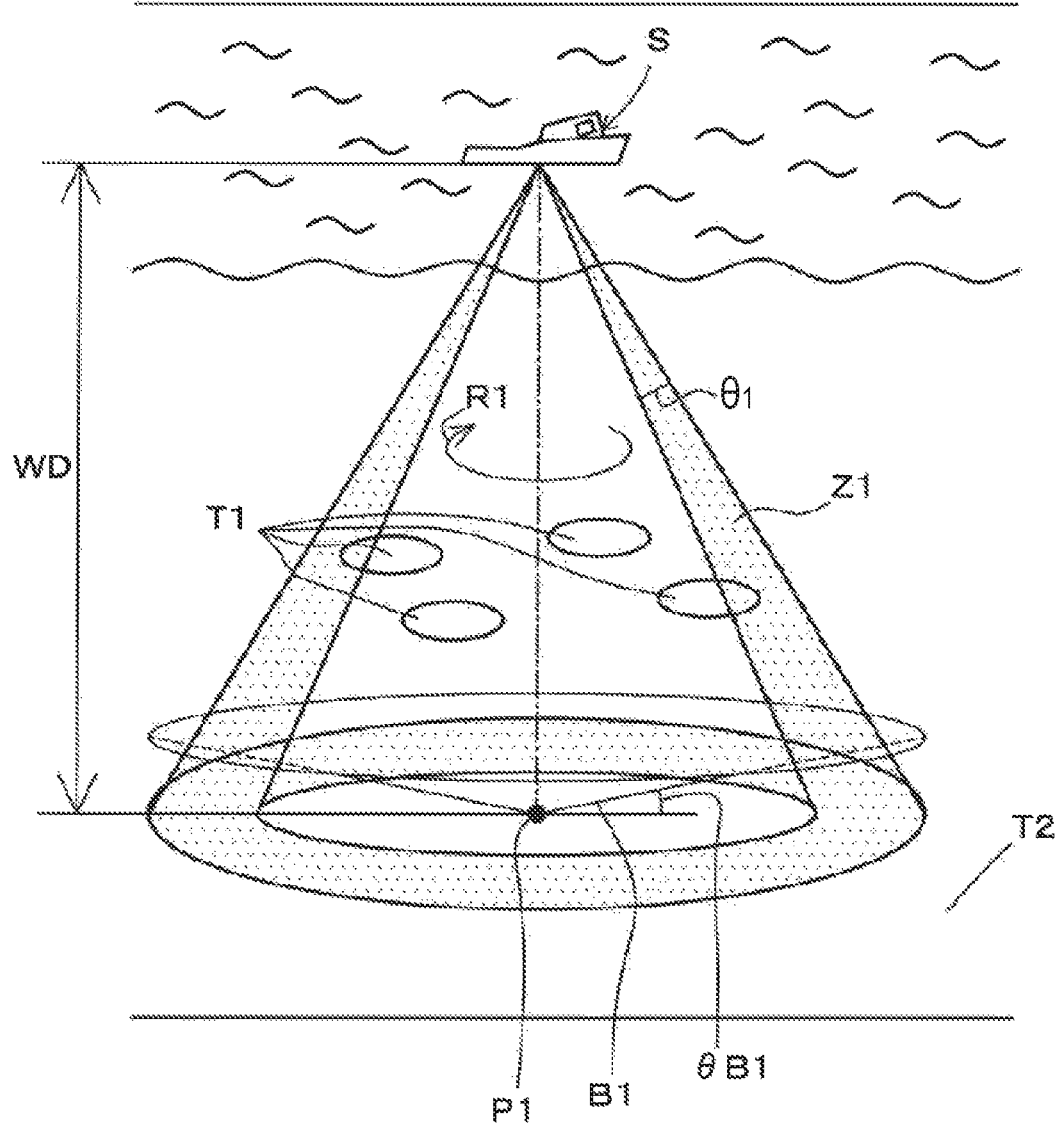
FIG. 2 is a view schematically illustrating a transmission range of a first transmission wave transmitted from a transducer.
Figure 3:
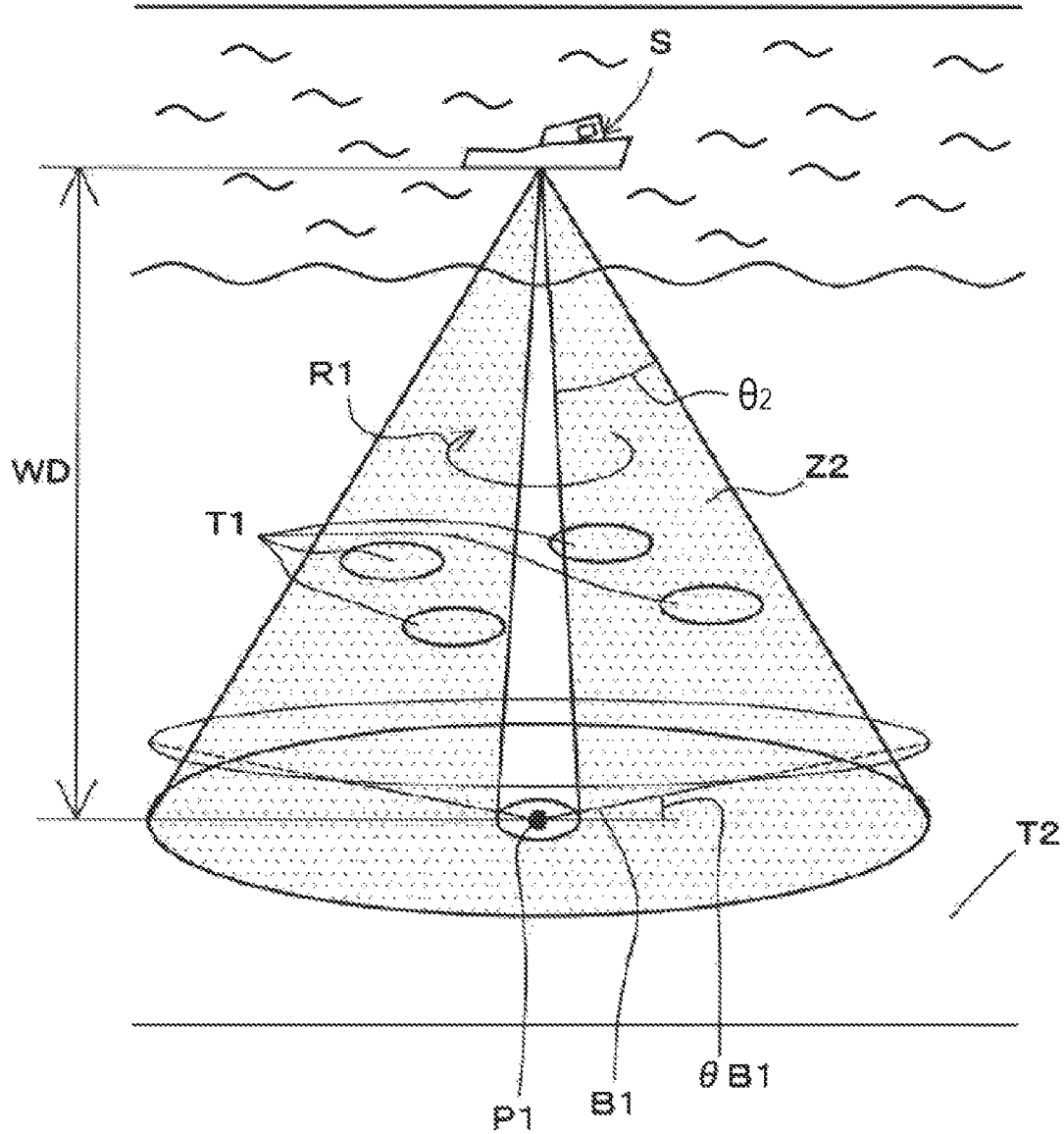
FIG. 3 is a view schematically illustrating a transmission range of a second transmission wave transmitted from the transducer.

FIG. 2 is a view schematically illustrating a transmission range of a first transmission wave which is transmitted from the transducer 2. FIG. 3 is a view schematically illustrating a transmission range of a second transmission wave which is transmitted from the transducer 2. In FIGS. 2 and 3, the transmission range of the transmission wave which is transmitted from the transducer 2 mounted on the ship S is schematically illustrated as the stippled section.

In this embodiment, the transducer 2 may transmit two kinds of transmission waves, specifically, the first transmission wave illustrated in FIG. 2 and the second transmission wave illustrated in FIG. 3. The transducer 2 may transmit the transmission waves in all horizontal directions from the ship.

The first transmission wave may be a transmission wave having a comparatively narrow beam width $\theta_1$ in the vertical plane. The beam width $\theta_1$ of the first transmission wave may be a few to a few dozen degrees, for example. Hereinafter, an area to which the first transmission wave is transmitted may be referred to as a 2D area Z1. Here, the beam width $\theta_1$ of the first transmission wave in the vertical plane may be a minimum vertical beam width which the transducer 2 can achieve, or may be a value close to the minimum vertical beam width, which makes the area to which the first transmission wave is transmitted comparatively narrow. Therefore, this area may be referred to as the 2D area Z1 in this specification.

The second transmission wave may be a transmission wave having a wider beam width $\theta_2$ in the vertical plane than the beam width $\theta_1$ of the first transmission wave. The beam width $\theta_2$ may be a few dozen degrees, for example. Hereinafter, an area to which the second transmission wave is transmitted may be referred to as a 3D area Z2. Here, while the beam width $\theta_1$ of the first transmission wave in the vertical plane is comparatively narrow as described above, the second transmission wave having the beam width $\theta_2$ of 20 degrees or more may be considered to have a sufficiently wide beam width, wider than the first transmission wave. Therefore, the area which has comparatively large 3D expansion and to which the second transmission wave having such a sufficient beam width is transmitted may be referred to as the 3D area Z2 in this specification.

The transducer 2 may perform a set of transmission of the first transmission wave and reception of reflection waves caused by the transmitted first transmission wave a plurality of times, for example. The transducer 2 may then perform a set of transmission of the second transmission wave and reception of reflection waves caused by the transmitted second transmission wave once.

The transmission and reception device 3 may drive the transducer 2 to transmit each transmission wave and generate a reception signal based on a reflection wave including a reflection of the transmission wave on an underwater target, such as a school of fish or a seabed.

Figure 4:
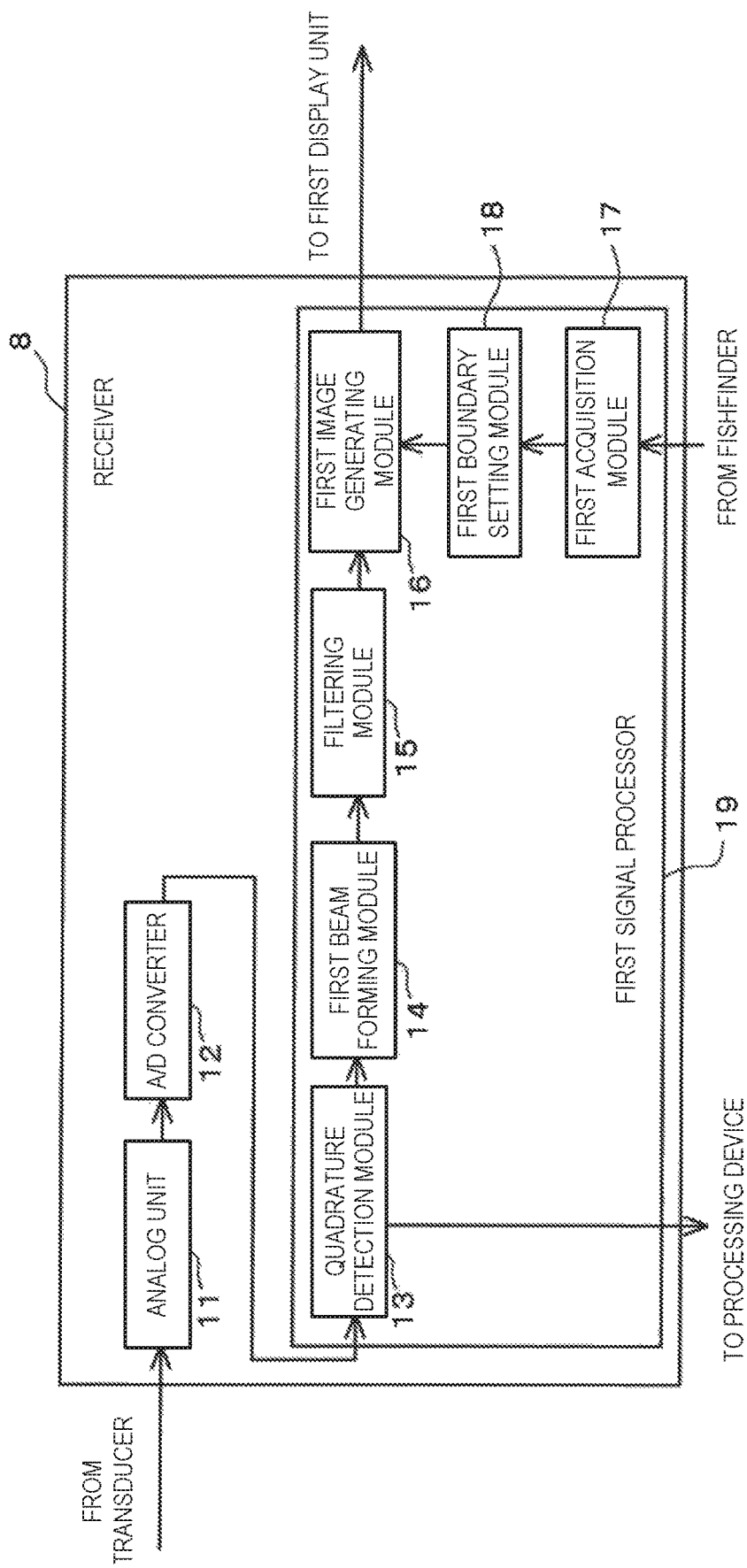
FIG. 4 is a block diagram illustrating a configuration of a receiver.

FIG. 4 is a block diagram illustrating a configuration of the receiver 8. As illustrated in FIGS. 1 to 4, the transmission and reception device 3 may include a transmission/reception switch 3a, a transmitter 7, and the receiver 8. The transmission and reception device 3 may be comprised of devices, such as a hardware processor 9 (CPU, FPGA, etc.) (which may also be referred to as processing circuitry), an analog circuit, and a nonvolatile memory. The hardware processor 9 may function as a first controlling module 7b, a quadrature detection module 13, a first beam forming module 14, a filtering module 15, a first image generating module 16, a first acquisition module 17, and a first boundary setting module 18, which are described later in detail. The hardware processor 9 may function as these modules, for example, by causing the CPU to read and execute program(s) from the nonvolatile memory. Further, the first controlling module 7b, a quadrature detection module 13, the first beam forming module 14, the filtering module 15, the first image generating module 16, the first acquisition module 17, and the first boundary setting module 18 may be included in a first signal processor 19.

The transmission/reception switch 3a may switch the signal transmission and reception status with respect to the transducer 2. For example, in order to drive the transducer 2 to output the transmission wave, the transmission/reception switch 3a may transmit a drive signal outputted from the transmitter 7 to the transducer 2. On the other hand, when receiving the reception signal from the transducer 2, the transmission/reception switch 3a may output the reception signal received by the transducer 2 to the receiver 8.

The transmitter 7 may generate the drive signal being the basis of the transmission wave transmitted by the transducer 2. The transmitter 7 may include a transmission circuit part 7a and the first controlling module 7b.

The transmission circuit part 7a may be controlled by the first controlling module 7b and a second controlling module 20 (described later in detail) of the processing device 5 to generate the drive signal. For example, the transmission circuit part 7a may have transmission circuits (not illustrated) provided corresponding to the ultrasonic transducers 2a, respectively. The transmission circuits may suitably be controlled by the first controlling module 7b to generate a first drive signal. The first drive signal may be a signal being the basis of the first transmission wave transmitted from the transducer 2. Moreover, each transmission circuit of the transmission circuit part 7a may be controlled by the second controlling module 20 to generate a second drive signal. The second drive signal may be a signal being the basis of the second transmission wave transmitted from the transducer 2.

The first controlling module 7b may suitably control each of the plurality of transmission circuits of the transmission circuit part 7a to generate the first drive signals.

The receiver 8 may include an analog unit 11, an A/D converter 12, and the first signal processor 19. The first signal processor 19 may include the quadrature detection module 13, the first beam forming module 14, the filtering module 15, the first image generating module 16, the first acquisition module 17, and the first boundary setting module 18. The analog unit 11 and the A/D converter 12 may be provided as a reception circuit part which generates a reception signal based on a reflection wave of a transmission wave.

The analog unit 11 may amplify an electric signal transmitted from the transducer 2 and limit its bandwidth, so as to remove an unnecessary frequency component. The analog unit 11 may process both of the electric signal obtained from the reflection wave of the first transmission wave and the electric signal obtained from the reflection wave of the second transmission wave.

The A/D converter 12 may convert the electric signal generated by the analog unit 11 into a digital reception signal. The A/D converter 12 may process the electric signal obtained from the reflection wave of the first transmission wave to generate a first reception signal, and process the electric signal obtained from the reflection wave of the second reception wave to generate a second reception signal.

The quadrature detection module 13 may apply quadrature detection processing on the first reception signal and the second reception signal obtained from each ultrasonic transducer 2a, to generate an I signal and a Q signal. These signals may be processed as a complex signal of which the real part is the I signal and the imaginary part is the Q signal. When the reception signals outputted from the A/D converter 12 are the first reception signals, the quadrature detection module 13 may output the generated complex signal to the first beam forming module 14 as first complex signal. On the other hand, when the reception signals outputted from the A/D converter 12 are the second reception signal, the quadrature detection module 13 may output the generated complex signal to the processing device 5 as second complex signal. Note that the output of the second complex signal from the quadrature detection module 13 to the processing device 5 may be performed after the second complex signal is temporarily stored in a memory (not illustrated) of the transmission and reception device 3.

Note that, although the example in which the quadrature detection module 13 generates the second complex signal and then outputs it to the processing device 5 is described in this embodiment, this disclosure is not limited to this. For example, the quadrature detection processing may be performed in the processing device 5 by outputting the second reception signals generated by the A/D converter 12 directly to the processing device 5.

The first beam forming module 14 may perform beamforming (specifically, summing phase shifted signals or adaptive beamforming) on the first complex signals obtained from two or more specific ultrasonic transducers 2a to obtain a first beam signal equivalent to a signal obtained from a single ultrasonic transducer having sharp directivity in a specific direction. The first beam forming module 14 may form a large number of first beam signals having directivity in every azimuth by repeating this process while changing the combination of the ultrasonic transducers 2a subjected to the beamforming. As illustrated in FIG. 2, thus formed first beam signals may have a comparatively narrow beam width $\theta_1$ in the vertical plane (e.g., about 8 degrees).

The filtering module 15 may generate a 2D position and an echo intensity to generate a 2D cross-section image IM2 described later, by applying band limiting filter or pulse compression filter on the first beam signals formed by the first beam forming module 14.

The first image generating module 16 may generate 2D cross-section data indicating distribution of underwater targets around the ship based on amplitudes of the first beam signals (specifically, absolute values of the complex signals) filtered by the filtering module 15. Further, the first image generating module 16 may generate the 2D cross-section image data D2 based on 2D cross-section data. For example, the first image generating module 16 may generate a top view image illustrating the distribution on a conical surface taking the vertex at a position of the transducer 2 of the ship S (hereinafter, may be referred to as "the horizontal mode image H1"), or image data indicating the distribution in a vertical plane which includes the transducer 2 (hereinafter, may be referred to as "the vertical mode image V1"). Note that the data of the image generated by the first image generating module 16 may be generated based on signals resulted from the first transmission waves having the comparatively narrow beam width, and obtained from a 2D area. Further, the area where the horizontal mode image H1 is obtained is the stippled section in FIG. 2.

Figure 5:
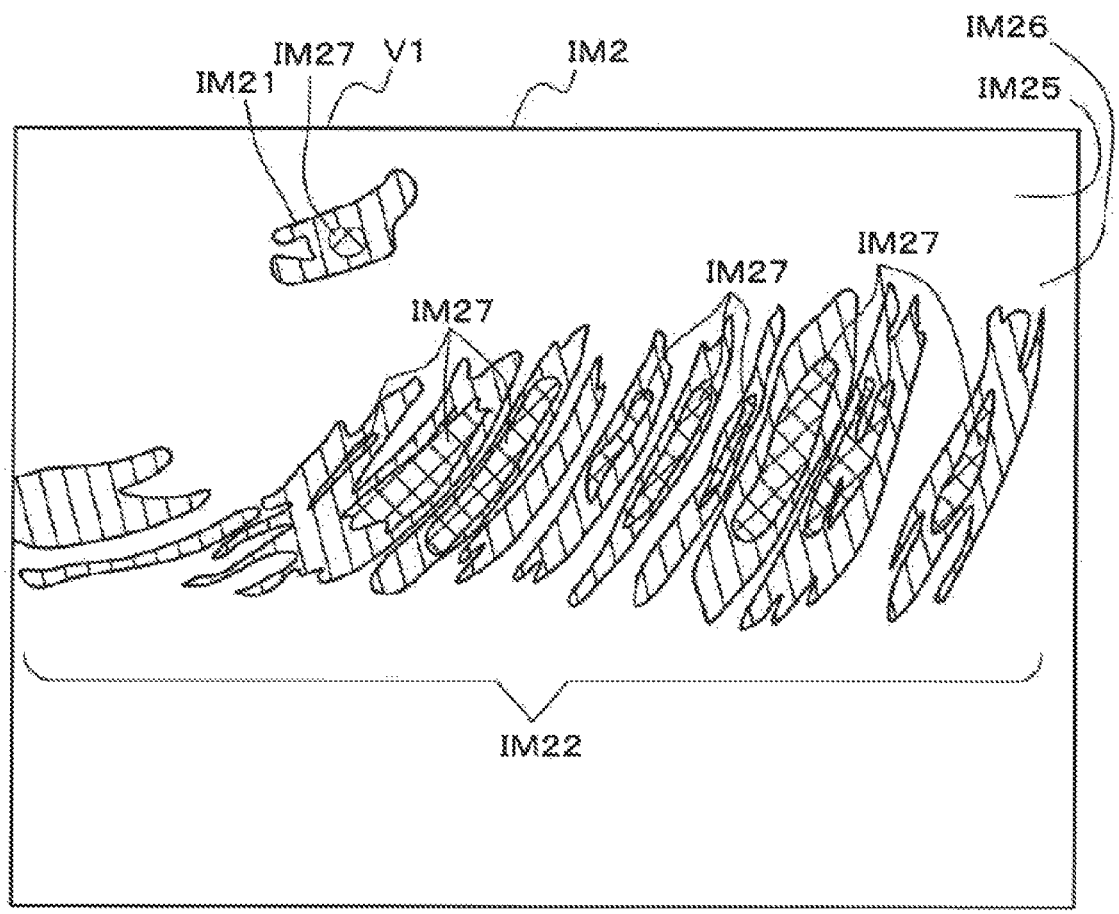
FIG. 5 is a view schematically illustrating one example of a 2D cross-section image displayed on a first display unit, illustrating a state before boundary processing is performed.

FIG. 5 is a view schematically illustrating one example of the 2D cross-section image IM2 displayed on the first display unit 4, illustrating a state before boundary processing is performed. As illustrated in FIGS. 1, 4 and 5, the first display unit 4 may display the horizontal mode image H1 and the vertical mode image V1 generated by the first image generating module 16. As one example, FIG. 5 illustrates the 2D cross-section image IM2 as the vertical mode image V1 at a certain time point. For example, a user may suitably operate the first user-interface 28, such as a keyboard or a touch panel, to display the horizontal mode image H1 and the vertical mode image V1 selectively in a switchable manner or simultaneously on the first display unit 4. The first user-interface 28 may be connected to the transmission and reception device 3, and, for example, by the user's press operation on the first user-interface 28, a given instruction signal may be generated and outputted to the transmission and reception device 3.

The 2D cross-section image IM2 may include high-intensity echo images IM27 in each of a shallow area IM25 corresponding to a comparatively shallow depth and a seabed depth area IM26 corresponding to a seabed depth. Particularly, the number of high-intensity echo images IM27 may be larger in the seabed depth area IM26 than in the shallow area IM25. In this embodiment, the high-intensity echo images IM27 in the shallow area IM25 may be school-of-fish echo images IM21 and the high-intensity echo images IM27 in the seabed depth area IM26 may be seabed echo images IM22.

The 2D cross-section image IM2 may be provided with multiple tones (colors) for the echo images according to the echo intensity. However, in FIG. 5, for the sake of convenience, the echo images in the 2D cross-section image IM2 are provided with two different tones according to the echo intensity. In this embodiment, the echo image with the highest echo intensity may be crosshatched and the echo image with the second-highest echo intensity may be hatched in a single direction. Hereinafter, the echo image with crosshatching may be referred to as the high-intensity echo image, and the echo image with single-direction hatching may be referred to as the medium-intensity echo image. Note that the first display unit 4 may actually illustrate the high-intensity echo image in darker red, and the medium-intensity echo image in lighter red. The color of the echo image may not be limited to those of this example and be other colors.

As described above, the first image data generating module 16 may generate data D2 which is the 2D cross-section image data D2 indicating the position (which may also be referred to as location) of the underwater targets based at least on the first reception signals, and includes the color information.

The processing device 5 may be a device connected to the transmission and reception device 3 of the scanning sonar 10 by a cable etc., and be configured by, for example, a PC (personal computer). Although described later in detail, the processing device 5 may process portion of the reception signals processed by the transmission and reception device 3.

The underwater detection apparatus 1 of this embodiment, not only is capable of causing the scanning sonar 10 to generate the projection images of the target object within the 2D area Z1 (see FIG. 2) near the ship (specifically, the horizontal mode image H1 and the vertical mode image V1), but may also be capable of causing the processing device 5 to generate projection images of underwater targets within the 3D area Z2 near the ship S (see FIG. 3). While the underwater detection apparatus 1 is not inputted a given instruction from the user via the second user-interface 29, such as the keyboard or a touch panel, the scanning sonar 10 may generate the 2D cross-section image IM2. On the other hand, when the underwater detection apparatus 1 receives the given instruction from the user via the second user-interface 29, the processing device 5, the scanning sonar 10, etc. may perform operations described below, to generate a 3D image IM3 projecting the underwater targets within the 3D area Z2 near the ship and a side image IM4 which is a side view of the 3D image IM3. Note that "the given instruction from the user" used herein may be an instruction for generating a projection image of the underwater targets in the 3D area Z2 as illustrated in FIG. 3 by stippling. Hereinafter, this given instruction may be referred to as the 3D image generation instruction.

Figure 6:
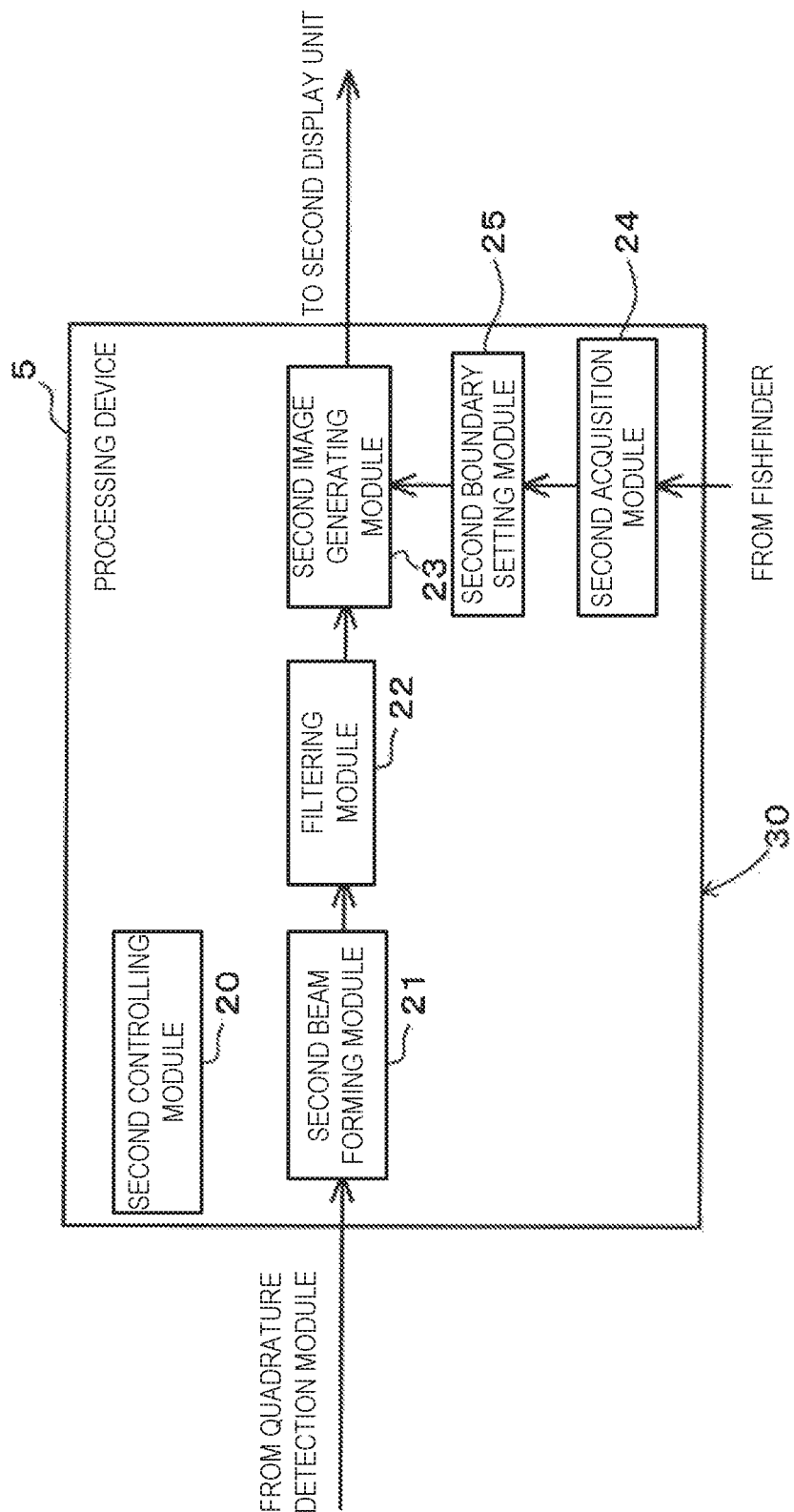
FIG. 6 is a block diagram illustrating a configuration of a processing device.

FIG. 6 is a block diagram illustrating a configuration of the processing device 5. As illustrated in FIGS. 1 and 6, the processing device 5 (which may also be referred to as a second signal processor) may include the second controlling module 20, a second beam forming module 21, a filtering module 22, a second image generating module 23, a second acquisition module 24, and a second boundary setting module 25.

The processing device 5 may be comprised of devices, such as a hardware processor 30 (CPU, FPGA, etc.)(which may also be referred to as processing circuitry), an analog circuit, and a nonvolatile memory. The hardware processor 30 may function as the second controlling module 20, the second beam forming module 21, the filtering module 22, the second image generating module 23, the second acquisition module 24, and the second boundary setting module 25, which are described later in detail. The hardware processor 30 may function as these modules, for example, by causing the CPU to read and execute program(s) from the nonvolatile memory.

Upon reception of the 3D image generation instruction by the user, the second controlling module 20 may suitably control each of the transmission circuits of the transmission circuit part 7a to generate the second drive signal. For example, when the transducer 2 has the cylindrical shape, the second controlling module 20 may control the amplitude and phase of the drive signal so that the function of the shading coefficient in the vertical plane becomes a sinc function.

The second beam forming module 21 may receive the second complex signals from the quadrature detection module 13 of the receiver 8. The second beam forming module 21 may perform beamforming (specifically, summing phase shifted signals or adaptive beamforming) on the second complex signals obtained from two or more specific ultrasonic transducers 2a to generate a second beam signal equivalent to a signal obtained from a single ultrasonic transducer having sharp directivity in a specific direction. The second beam forming module 21 may form a large number of second beam signals having directivity in every azimuth by repeating this process while changing the combination of the ultrasonic transducers 2a subjected to the beamforming. The generated second beam signals may have a narrower beam width than the beam width $\theta_2$ of the second transmission wave, and the second beam forming module 21 may scan the range where the second transmission waves are transmitted, by gradually changing a tilt angle of the signal. Note that positional information of each 3D data (described later in detail) generated based on each beam signal may be calculated based on a distance from the transducer 2 to an object on which the second transmission wave is reflected, and a direction of the second beam signal. The distance may be obtained based on the time length from the transmission to reception of the second transmission wave.

The filtering module 22 may apply band limiting filter or pulse compression filter on the second beam signals formed by the second beam forming module. Each second beam signal processed by the filtering module 22 may be a signal obtained from each position within the 3D area Z2, and have information of a 3D position at which each signal is obtained, and an echo intensity.

The second image generating module 23 may generate the 3D data indicating distribution of underwater targets around the ship based on amplitudes of the second beam signals (specifically, absolute values of the complex signals) filtered by the filtering module 22. For example, the second image generating module 23 may generate the 3D data based on the signals obtained from the 3D area Z2 (see FIG. 3). Further, the second image generating module 23 may generate 3D image data D3 which is image data of the 3D image IM3 and the side image IM4 by projecting the 3D data on a 2D projection plane.

As described above, the second image data generating module 23 may generate 3D image data D3 which is the 3D image data D3 indicating the position of the underwater targets based at least on the second reception signals, and includes the color information.

Figure 7:
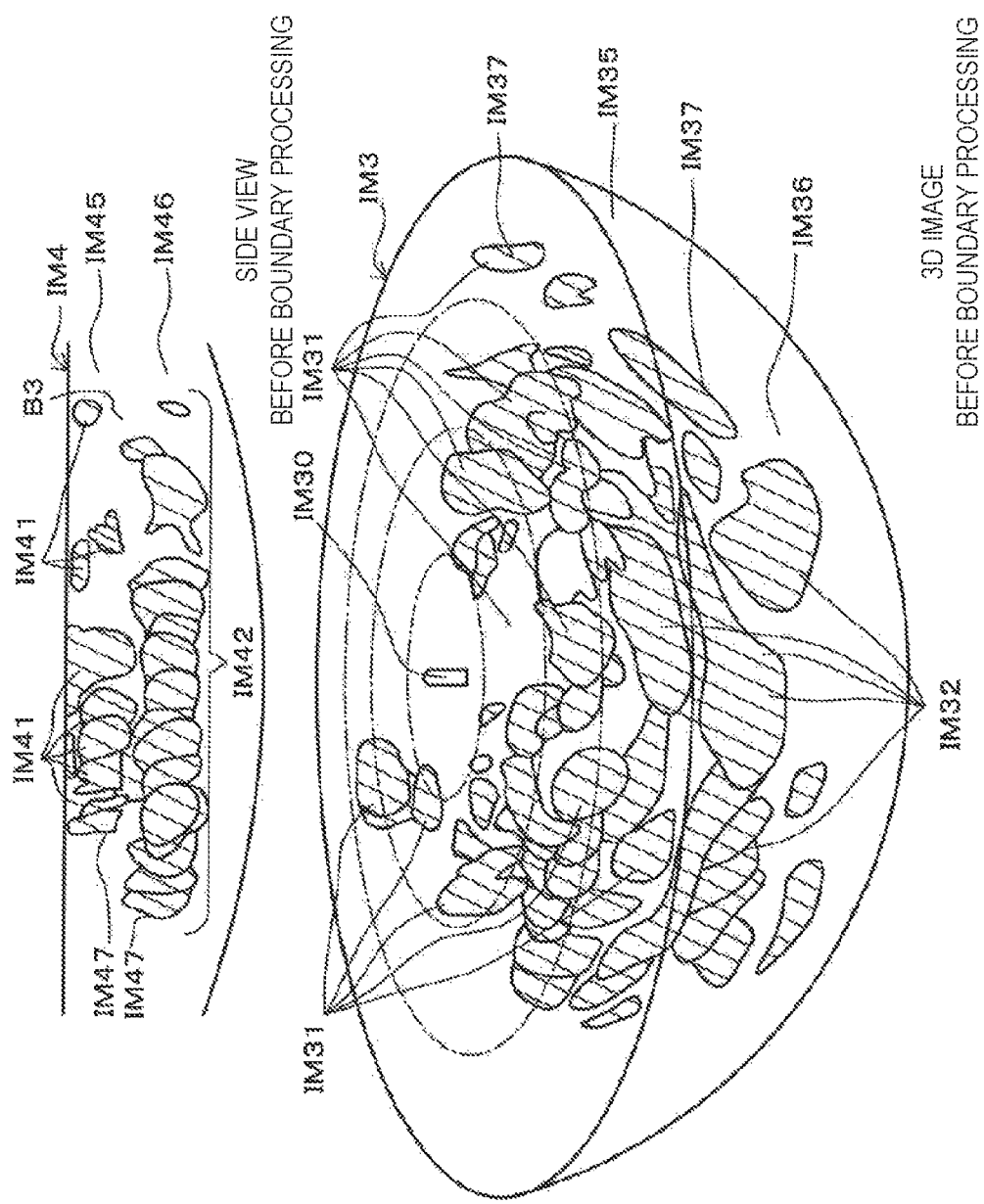
FIG. 7 shows in a lower part a schematic view illustrating a 3D image defined by 3D image data generated by a second image data generating module, illustrating a state before the boundary processing is performed, and shows in an upper part a schematic view illustrating a side image which is a side view of the 3D image, illustrating the state before the boundary processing is performed.

FIG. 7 shows in a lower part a schematic view illustrating the 3D image IM3 defined by the 3D image data D3 generated by the second image data generating module 23, illustrating a state before boundary processing is performed, and shows in an upper part a schematic view illustrating the side image IM4 which is a side view of the 3D image IM3, illustrating the state before the boundary processing is performed. As illustrated in FIGS. 1, 6 and 7, the 3D image data D3 generated by the second image data generating module 23 may be outputted to the second display unit 6. The second display unit 6 may display the image defined by the provided 3D image data D3 on a display screen of the second display unit 6.

The second display unit 6 may suitably display the 3D image IM3, the side image IM4 of the 3D image IM3, etc. The 3D image IM3 and the side image IM4 may be displayed selectively or simultaneously. When simultaneously displaying the 3D image IM3 and the side image IM4, the side image IM4 may be displayed above the 3D image IM3, for example.

The 3D image IM3 may illustrate a 3D space spreading in a horizontal plane and a water depth direction centering on a ship position marker IM30. In the 3D image IM3, an x-axis and a y-axis extend in the horizontal plane, and the z-axis extends in the water depth direction.

For the sake of convenience, the 3D image IM3 may illustrate echo images with echo intensity above a given value. In this embodiment, the echo image with the echo intensity above the given value may be hatched in a single direction. Hereinafter, the hatched echo image with the echo intensity above the given value may be referred to as the high-intensity echo image. Note that, although the first display unit 4 may actually illustrate the high-intensity echo image in red, a different color may alternatively be used.

The 3D image IM3 may include high-intensity echo images IM37 in each of a shallow area IM35 corresponding to a comparatively shallow depth and a seabed depth area IM36 corresponding to a seabed depth. In the 3D image IM3 illustrated in FIG. 7 as one example, the number of high-intensity echo images IM37 may be larger in the seabed depth area IM36 than in the shallow area IM35. Moreover, regarding an azimuth direction R1 around the ship S (the azimuth direction R1 is illustrated in FIGS. 2 and 3), the high-intensity echo images IM37 may be arranged relatively unevenly in the shallow area IM35, whereas the high-intensity echo images IM37 may be arranged evenly in the seabed depth area IM36. In this embodiment, the high-intensity echo images IM37 in the shallow area IM35 may be school-of-fish echo images IM31 and the high-intensity echo images IM37 in the seabed depth area IM36 may be seabed echo images IM32.

Similarly to the 3D image IM3, the side image IM4 may include high-intensity echo images IM47 in each of a shallow area IM45 corresponding to a comparatively shallow depth and a seabed depth area IM46 corresponding to a seabed depth. In the side image IM4 illustrated in FIG. 7 as one example, the number of high-intensity echo images IM47 may be larger in the seabed depth area IM46 than in the shallow area IM45. In this embodiment, the high-intensity echo images IM47 in the shallow area IM45 may be school-of-fish echo images IM41 and the high-intensity echo images IM47 in the seabed depth area IM46 may be seabed echo images IM42.

In the 3D image IM3 and the side image IM4, the high-intensity echo images IM37 and IM47 of the shallow areas IM35 and IM45 may be illustrated in similar shapes with similar echo intensities to the high-intensity echo images IM37 and IM47 of the seabed depth areas IM36 and IM46, respectively, and it may be difficult to differentiate them from each other. Moreover, as illustrated in FIG. 5, also in the 2D cross-section image IM2, it may be preferable to make the high-intensity echo images IM27 in the shallow depth area IM25 clearly differentiable from the high-intensity echo images IM27 in the seabed depth area IM26. Therefore, in this embodiment, the boundary processing may be performed to facilitate visual differentiation of the high-intensity echo images IM27, IM37 and IM47 in the seabed depth areas IM26, IM36 and IM46 from the high-intensity echo images IM27, IM37 and IM47 outside the seabed depth areas IM26, IM36 and IM46.

Figure 8:
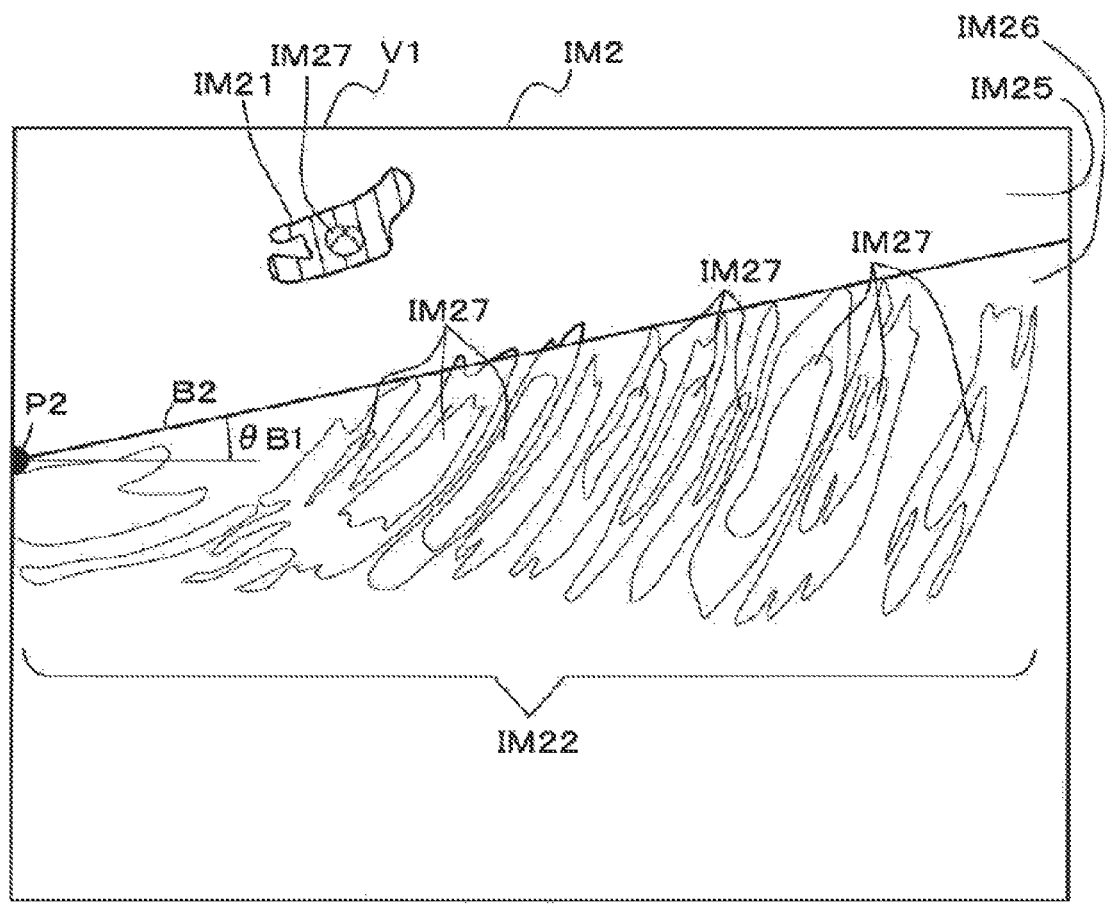
FIG. 8 is a view schematically illustrating one example of a 2D cross-section image displayed on the first display unit, illustrating a state after the boundary processing is performed.
Figure 9:
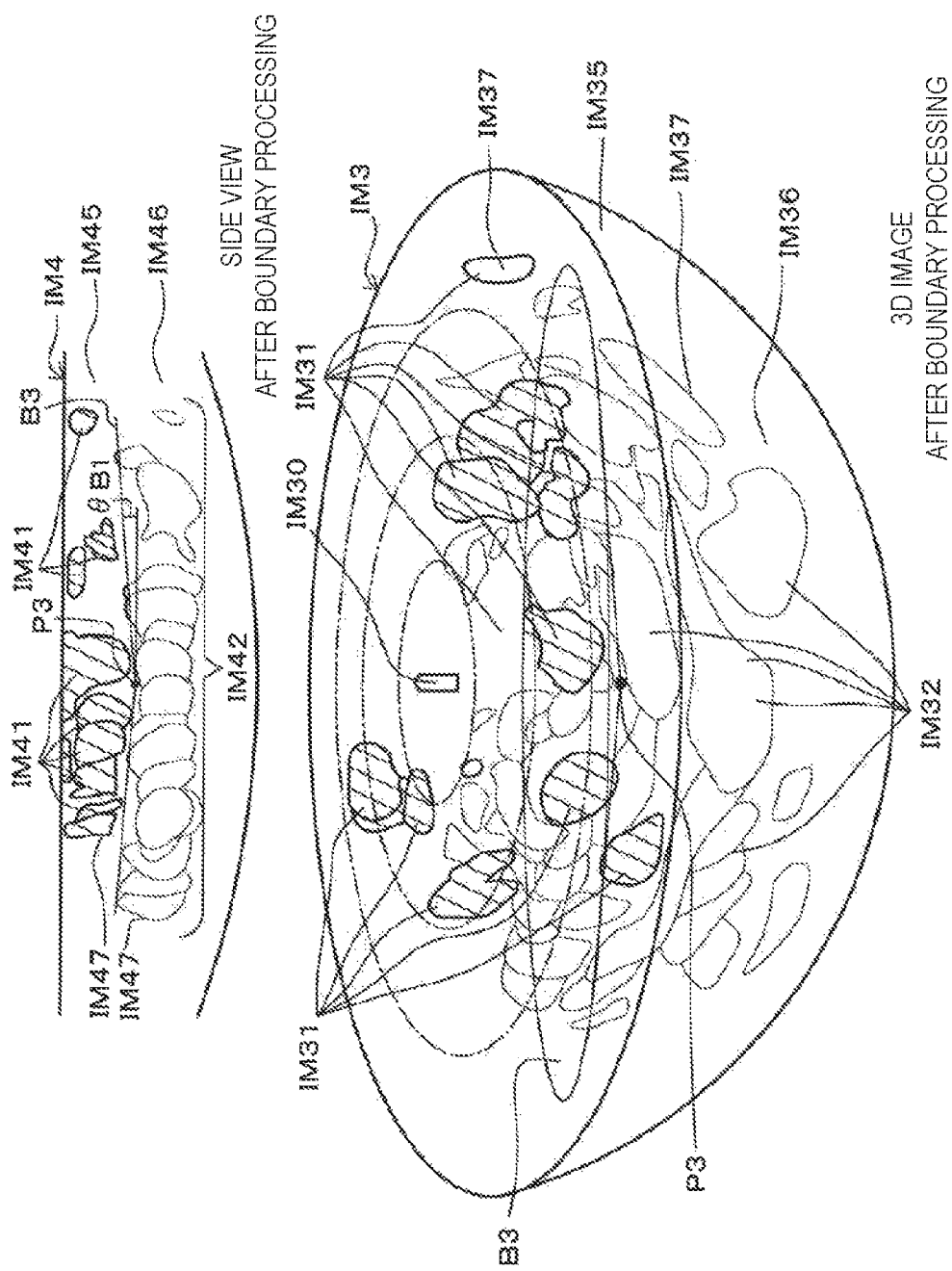
FIG. 9 shows in a lower part a schematic view illustrating a 3D image formed by the second image data generating module, illustrating a state after the boundary processing is performed, and shows in an upper part a schematic view illustrating a side image which is a side view of the 3D image, illustrating the state after the boundary processing is performed.

FIG. 8 is a view schematically illustrating one example of the 2D cross-section image IM2 displayed on the first display unit 4, illustrating a state after the boundary processing is performed. FIG. 9 shows in a lower part a schematic view illustrating a 3D image IM3 formed by the second image data generating module 23 in a state after the boundary processing is performed, and shows in an upper part a schematic view illustrating a side image IM4 which is a side view of the 3D image IM3, illustrating the state after the boundary processing is performed.

Next, the boundary processing will be described in detail with reference to FIGS. 1, 2 and 4 to 9. In this embodiment, each of the first acquisition module 17 of the receiver 8, the second acquisition module 24 of the processing device 5 may acquire a water bottom depth WD straight below the ship S (i.e., water depth data). Further, each of the first boundary setting module 18 of the receiver 8 and the second boundary setting module 25 of the processing device 5 may set a boundary B1 passing at a reference point P1 having a depth substantially equal to the acquired water bottom depth WD and having a given angle θB1 with a horizontal direction.

Next, the first image data generating module 16 may process the 2D cross-section image data D2 so that the color information of the 2D cross-section image IM2 defined by the 2D cross-section image data D2 at least agrees with position of underwater targets T1 and T2 with respect to the boundary B1. Similarly, the second image data generating module 23 may process the 3D image data D3 so that the color information of the 3D image IM3 defined by the 3D image data D3 and the side image IM4 at least agrees with the position of underwater targets T1 and T2 with respect to the boundary B1.

The water bottom depth WD may be a distance between a surface of the seabed T2 (seabed surface) and the ship S (sea surface) at a position straight below the ship S. Strictly speaking, since the transducer 2 is located at a given depth from the sea surface, a value obtained by subtracting the given depth from the water bottom depth obtained from a fishfinder 31 (described later) etc. may be used as the water bottom depth WD. However, in this embodiment, for the sake of simplicity, the water bottom depth WD obtained from the fishfinder 31 etc. may be used as the water bottom depth WD for the underwater detection apparatus 1. In this embodiment, the acquisition modules 17 and 24 may obtain the underwater depth information from the fishfinder 31 which is an external information source different from the reception signals from the transducer 2 (i.e., the first reception signals and the second reception signals), or by a manual operation by the user on one of the first user-interface 28 and the second user-interface 29.

For example, the user can look at the 2D cross-section image IM2 displayed on the first display unit 4 to input the water bottom depth WD via the first user-interface 28. When the acquisition modules 17 and 24 obtain the water bottom depth WD upon reception of the manual operation by the user on one of the first user-interface 28 and the second user-interface 29, the water bottom depth WD directly below the ship S may be provided from the one of the first user-interface 28 and the second user-interface 29 to the respective image data generating modules 16 and 23.

Next, the configuration for each of the acquisition modules 17 and 24 to obtain the water bottom depth WD from the fishfinder 31 will be described.

Figure 10:
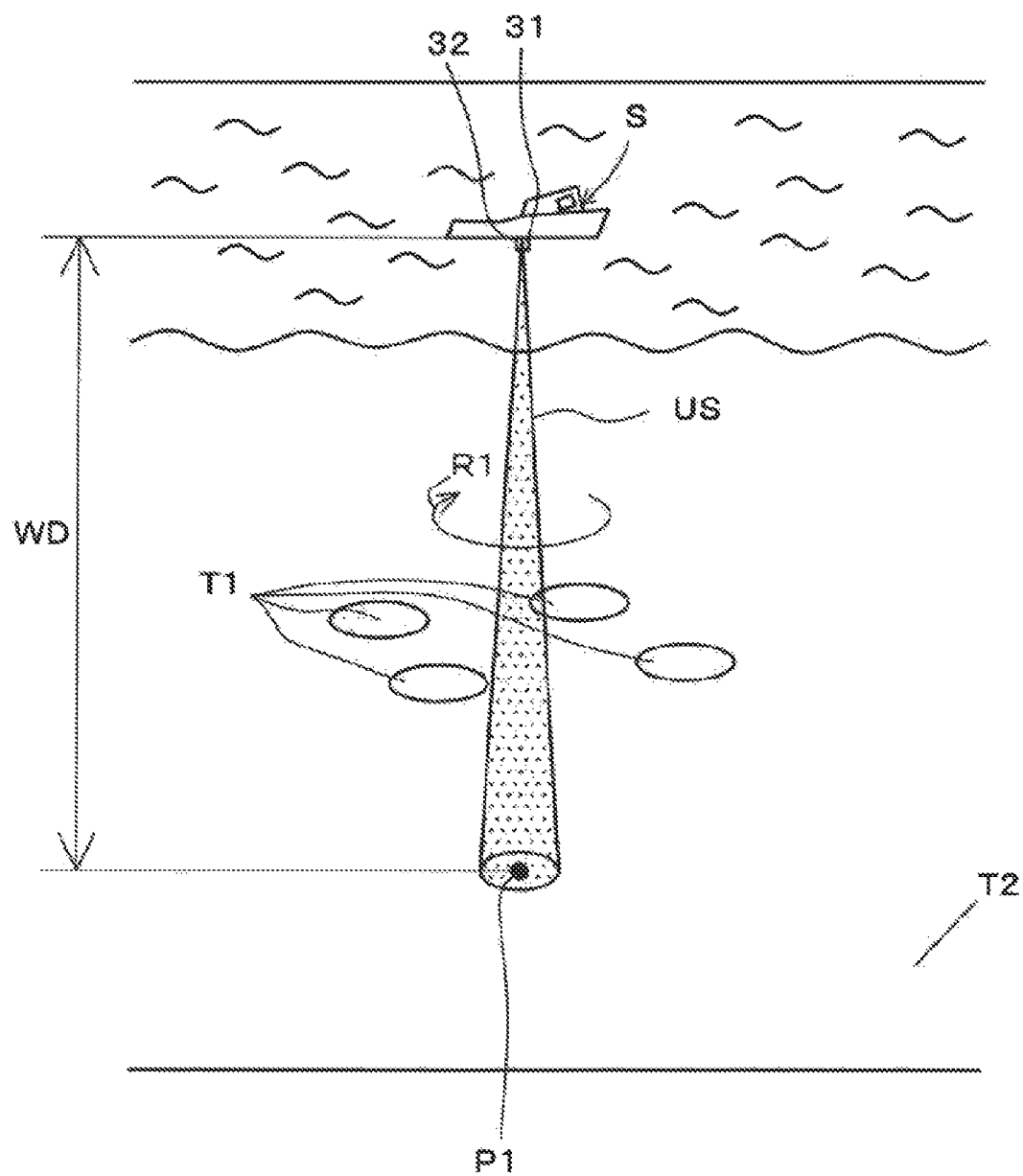
FIG. 10 is a view schematically illustrating a transmission wave transmitted from a transducer of a fishfinder.

FIG. 10 is a view schematically illustrating a transmission wave US transmitted from a transducer 32 of the fishfinder 31. As illustrated in FIG. 10, the fishfinder 31 may have the transducer 32 and a signal processor (not illustrated).

The transducer 32 may convert an electric signal into the transmission wave US as an ultrasonic wave, transmit the transmission wave US underwater at every given timing (i.e., at a given cycle), and convert the received ultrasonic wave into an electric signal. The transducer 32 may transmit the ultrasonic wave vertically downwardly from the ship S. The ultrasonic wave may be transmitted, for example, in a conically-shaped area.

The signal processor of the fishfinder 31 may process the reception wave received by the transducer 32 after the transmission of the transmission wave US, to calculate the water bottom depth WD. For example, the signal processor may calculate a distance from a position where echo intensities above a given value uniformly spread in horizontal directions to the ship S (transducer 32), as the water bottom depth WD. The signal processor of the fishfinder 31 may output the water bottom depth WD to the first boundary setting module 18 and the second boundary setting module 25.

Returning to FIGS. 1, 2 and 4 to 9, the first image data generating module 16 may perform the boundary processing upon reception, by the user's operation on the first user-interface 28, of an instruction for setting the color information based on the position of the underwater target with respect to the boundary B1 from the first user-interface 28. Note that, hereinafter, the boundary processing performed by the first image data generating module 16 may also be referred to as the first boundary processing.

Further, the second image data generating module 23 may perform the boundary processing upon reception, by the user's operation on the second user-interface 29, of an instruction for setting the color information based on the position of the underwater target with respect to the boundary B1 from the second user-interface 29. Note that, hereinafter, the boundary processing performed by the second image data generating module 23 may also be referred to as the second boundary processing.

In the first boundary processing, the first boundary setting module 18 may first set the boundary B1. Similarly in the second boundary processing, the second boundary setting module 25 may first set the boundary B1. The boundary B1 may be a conical surface and have a shape including a straight line.

The boundary B1 may make the given angle θB1 with the horizontal direction. This angle θB1 may be an oblique angle. This is because, as well illustrated in the 2D cross-section image IM2, even if the actual seabed is flat, an upper end position of the seabed echo image IM22 may be illustrated higher as the seabed is going away from directly below the ship, due to the resolution of the scanning sonar 10, etc.

As well illustrated in FIGS. 8 and 9, reference point images P2 and P3 corresponding to the reference point P1 and boundary images B2 and B3 corresponding to the boundary B1 may preferably be displayed in the 2D cross-section image IM2, the 3D image IM3, and the side image IM4. The boundary image B2 may be a boundary set in the 2D cross-section image IM2 and, for example, may be a straight line. On the other hand, the boundary image B3 may be a boundary set in each of the 3D image IM3 and the side image IM4. The boundary image B3 may be displayed in the 3D image IM3 as a conical surface formed to include a straight line, and be displayed in the side image IM4 in a substantially V-shape including a straight line.

Note that, alternatively, the reference point image P2 corresponding to the reference point P1 and the boundary image B2 corresponding to the boundary B1 may be displayed in the 2D cross-section image IM2, without displaying the reference point image P3 and/or the boundary image B3.

Each of the boundary images B2 and B3 may make a given angle θB1 with a horizontal plane in the corresponding 2D cross-section image IM2, 3D image IM3, or side image IM4. This angle θB1 may be an oblique angle.

The angle θB1 may preferably be set to extend, for example, along upper end positions of the seabed echo images IM22, IM32 and IM42. The first boundary setting module 18 may set the angle θB1 based on the beam width of the reception beam formed to generate the first reception signal. Similarly, the second boundary setting module 25 may set the angle θB1 based on the beam width of the reception beam formed to generate the second reception signal.

Note that the angle θB1 may be set or finely adjusted manually according to an instruction from the user operating the first user-interface 28. Similarly, the angle θB1 may be set or finely adjusted manually according to an instruction from the user operating the second user-interface 29. In the case of manually setting the angle θB1 by the user, the fine adjustment may be carried out by the user operating numeric keys of the user-interfaces 28 and 29. Alternatively, the water bottom depth WD may be adjusted by a drag and drop operation on the reference image P2 by the user's operation on the mouse, and the angle θB1 may be set by a drag and drop operation on the boundary image B2. Furthermore, the display units 4 and 6 may be provided with a touch panel function so that the user performs a touch operation on the touch panels as the user-interfaces 28 and 29 to set the angle θB1. With the touch panel input method, a change operation of the angle θB1 may immediately be reflected on the display contents of the display units 4 and 6 and the adjusting operation may be facilitated. Note that, also in the case of the user manually inputting the water bottom depth WD, the input may be carried out by the touch panel operation described above.

The first image data generating module 16 may set the color information of the seabed T2 as the underwater target located deeper than the boundary B1 independently of the color information of the school of fish T1 etc. as the underwater target located shallower than the boundary B1. Further, the first image data generating module 16 may set the color information independently of the signal level of the first reception signal, for the underwater target located deeper than the boundary B1 and having the signal level of the first reception signal higher than a given threshold (e.g., above a signal level of the medium-intensity echo image), as the seabed T2.

In this embodiment, in the 2D cross-section image IM2, the first image data generating module 16 may set the color of the seabed echo image IM22 located below the boundary image B2 to be different from the color of the school-of-fish echo image IM21 located above the boundary image B2. The first image data generating module 16 may set the color of the seabed echo image IM22 located below the boundary image B2 into a single color such as light gray. FIG. 8 indicates that the first image data generating module 16 changed the seabed echo image IM22 located below the boundary image B2 from the hatching display to a thin contour display for the sake of convenience. Note that the seabed echo image IM22 located below the boundary image B2 may be displayed in gradation.

When the first image data generating module 16, the first acquisition module 17, and the first boundary setting module 18 receive an instruction to perform the first boundary processing from the first user-interface 28, they may perform the above processing as the first boundary processing. Further, the first image data generating module 16 may generate boundary image data indicating the position of the boundary image B2, and add this boundary image data to the 2D cross-section image data D2 as the first image data. This 2D cross-section image D2 is one example of "image data" of this disclosure.

Similarly to the description above, the second image data generating module 23 may set the color information of the seabed T2 as the underwater target located deeper than the boundary B1 independently of the color information of the school of fish T1 etc. as the underwater target located shallower than the boundary B1. Further, the second image data generating module 23 may set the color information independently of the signal level of the second reception signal, for the underwater target located deeper than the boundary B1 and having the signal level of the second reception signal higher than a given threshold (e.g., above a signal level of the high-intensity echo image), as the seabed T2.

In this embodiment, in the 3D image IM3 and the side image IM4, the second image data generating module 23 may set the color of the echo images IM37 and IM47 (seabed echo images IM32 and IM42) located below the boundary image B3 to be different from the color of the echo images IM37 and IM47 (school-of-fish echo images IM31 and IM41) located above the boundary image B3. The second image data generating module 23 may set the color of the echo images IM37 and IM47 (seabed echo images IM32 and IM42) located below the boundary image B3 into a single color such as light gray. FIG. 9 indicates that the second image data generating module 23 changed the echo images IM37 and IM47 located below the boundary image B3 from the hatching display to a thin contour display for the sake of convenience. Note that the seabed echo images IM32 and IM42 located below the boundary image B3 may be displayed in gradation.

Note that, in this embodiment, the color of the echo image may be varied above and below the boundary image B3 only in the 3D image IM3 and the side image IM4, without varying the color above and below the boundary image B2 in the 2D cross-section image IM2.

When the second image data generating module 23, the second acquisition module 24, and the second boundary setting module 25 receive an instruction to perform the second boundary processing from the second user-interface 29, they may perform the above processing as the second boundary processing. Further, the second image data generating module 23 may generate boundary image data indicating the position of the boundary image B3, and add this boundary image data to the 3D image data D3 as the second image data. Here, the 3D image data D3 may include the data of the line indicating the boundary image B3 in the side image IM4. That is, the second image data generating module 23 may include image data which defines the side image IM4 illustrating one side of the 3D image IM3 and include the data of the line indicating the boundary image B3, in the 3D image data D3. Note that, the boundary image B3 may alternatively not be displayed in the 3D image IM3 and the side image IM4 while the boundary image B2 is displayed in the 2D cross-section image IM2.

Moreover in this embodiment, the second image data generating module 23 may generate the 3D image data D3 so that the 3D image IM3 and the side image IM4 are displayed in parallel on the second display unit 6. Note that the second image data generating module 23 may alternatively generate the 3D image data D3 so that the 3D image IM3 and the side image IM4 are selectively displayed on the second display unit 6.

Figure 11:
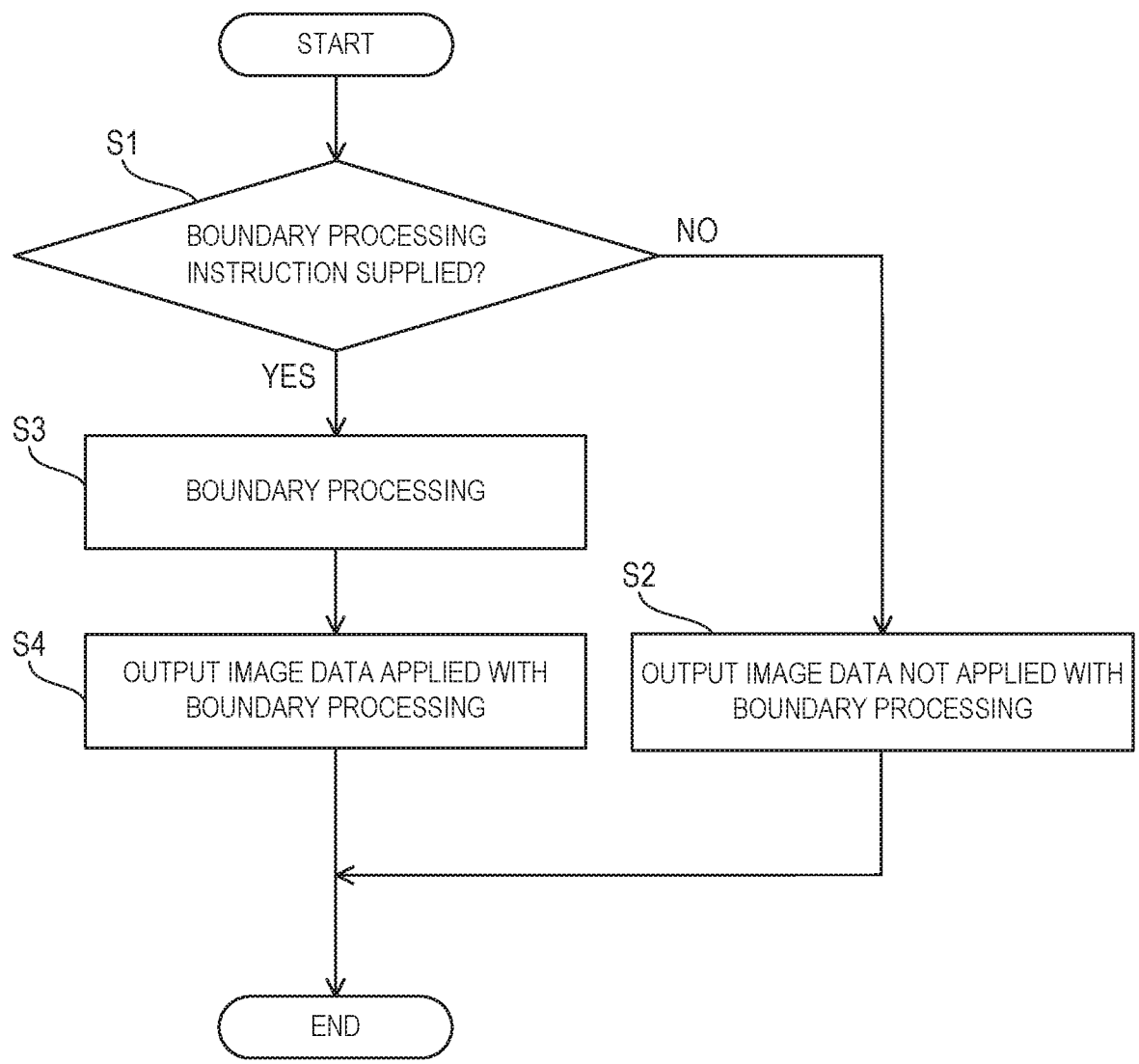
FIG. 11 is a flowchart illustrating one example of a flow of image processing at each image data generating module.

Next, one example of a flow of image processing at the first and second image data generating modules 16 and 23 will be described. FIG. 11 is a flowchart illustrating this example. Note that, hereinafter, when explaining with reference to the flowchart, other drawings than the flowchart may suitably be used as a reference. This flowchart illustrates processing after the image data generating modules 16 and 23 generate the 2D cross-section image data D2 and the 3D image data D3 which are not applied with the boundary processing (i.e., the data indicating the 2D cross-section image IM2 illustrated in FIG. 5, the 3D image IM3 and the side image IM4 illustrated in FIG. 7).

As illustrated in FIG. 11, the image data generating modules 16 and 23 may determine whether the boundary processing instruction is supplied by the user via the corresponding user-interfaces 28 and 29, respectively (S1).

In the case where the boundary processing instruction is not supplied from the corresponding user-interfaces 28 and 29 (NO at S1), the image data generating modules 16 and 23 may output the corresponding 2D cross-section image data D2 and 3D image data D3 which are not applied with the boundary processing, to the corresponding display units 4 and 6 (S2), respectively. Thus, the first display unit 4 may display the 2D cross-section image IM2 illustrated, for example, in FIG. 5, and the second display unit 6 may display the 3D image IM3 and the side image IM4 illustrated, for example, in FIG. 7.

On the other hand, in the case where the boundary processing instruction is supplied from the corresponding user-interfaces 28 and 29 (YES at S1), the corresponding image data generating modules 16 and 23 may perform the boundary processing described above in cooperation with the corresponding acquisition modules 17 and 24 and boundary setting modules 18 and 25, respectively (S3). Thus, the first image data generating module 16 may process the 2D cross-section image D2 so that the boundary image B2 is displayed in the 2D cross-section image IM2 and the seabed echo image IM22 below the boundary image B2 has a different color from that of the school-of-fish echo image IM21 above the boundary image B2. Further, the second image data generating module 23 may process the 3D image data D3 so that the boundary image B3 is displayed in the 3D image IM3 and the side image IM4 and the echo images IM37 and IM47 below the boundary image B3 (seabed echo images IM32 and IM42) have a different color from that of the echo images IM37 and IM47 (school-of-fish echo images IM31 and IM41) above the boundary image B3.

Next, the image data generating modules 16 and 23 may output the corresponding 2D cross-section image data D2 and image data D3 which are applied with the boundary processing, to the corresponding display units 4 and 6, respectively (S4). Thus, the first display unit 4 may display the 2D cross-section image IM2 illustrated, for example, in FIG. 8, and the second display unit 6 may display the 3D image IM3 and the side image IM4 illustrated, for example, in FIG. 9.

Note that, in a case where the boundary processing instruction is supplied to one of the first and second image data generating modules 16 and 23, the image data generating module supplied with the boundary processing instruction may perform the processing of S3 and S4. Here, the image data generating module to which the boundary processing instruction is not supplied may perform the processing of S2.

[Effects]

As described above, according to this embodiment, upon receiving the boundary processing instruction, the image data generating modules 16 and 23 may generate the 2D cross-section image data D2 and 3D image data D3 which represent the position of the underwater targets, and include the color information. This color information may be set to agree with the position of the underwater targets T1 and T2 with respect to the boundary B1. According to this configuration, since each of the image data generating modules 16 and 23 may set the boundary B1 with simple processing based on the water bottom depth information, complex processing for differentiating the seabed T2 from the area above the seabed T2 (i.e., seabed differentiating processing) may be unnecessary. Thus, since each of the image data generating modules 16 and 23 may set the boundary B1 with the small data amount by using the water bottom depth WD, the calculation load may be reduced and the water bottom surface may be displayed on the corresponding display units 4 and 6, respectively, with even simpler processing. Moreover, a possibility that a school of demersal fish, which is conventionally determined as the seabed in the seabed detection processing (the school-of-fish echo images IM21, IM31 and IM41 near the seabed echo images IM22, IM32 and IM42), is displayed in a different color from that of the seabed echo images IM22, IM32 and IM42 on the echo images IM2, IM3 and IM4 may be increased.

Further, in this embodiment, the angle θB1 of the boundary B1 may be an oblique angle. Thus, in each of the 2D cross-section image IM2, the 3D image IM3 and the side image IM4, an apparent inclination of the seabed surface which occurs due to the beam width of the reception beam when receiving the reflection wave of the transmission wave may be corrected.

Further, according to this embodiment, when setting the angle θB1 based on the beam width of the reception beam when receiving the reflection wave of the transmission wave, an apparent inclination of the seabed T2 in the 2D cross-section image IM2, the 3D image IM3 and the side image IM4 may accurately be corrected. Moreover, when the angle θB1 of the boundary B1 is adjusted according to an instruction from the user, the apparent inclination of the seabed T2 in the 2D cross-section image IM2, the 3D image IM3 and the side image IM4 may be corrected depending on the user's preference.

Furthermore, according to this embodiment, each of the acquisition modules 17 and 24 may obtain the water bottom depth WD from the fishfinder 31 which is an external information source different from the scanning sonar 10, or from the user. According to this configuration, also in a case where the scanning sonar 10 is not capable of outputting the transmission wave straight below the ship S is used, the acquisition modules 17 and 24 may accurately obtain water bottom depth information straight below the ship S.

Further according to this embodiment, in the corresponding 2D cross-section image IM2, 3D image IM3, and side image IM4, each of the image data generating modules 16 and 23 may have the color information to be different between the echo images located below the corresponding boundary images B2 and B3 (seabed echo images IM22, IM32 and IM42) and the echo images located above the corresponding boundary images B2 and B3 (school-of-fish echo images IM21, IM31 and IM41). Thus, in the 2D cross-section image IM2, the 3D image IM3, and the side image IM4, the seabed echo images IM22, IM32 and IM42 and the school-of-fish echo images IM21, IM31 and IM41 may easily be distinguished.

Moreover, according to this embodiment, the first and second image data generating modules 16 and 23 may add the data indicating the position of the boundary images B2 and B3 corresponding to the boundary B1, to the 2D cross-section image D2 and the 3D image data D3 by the boundary processing. According to this configuration, the corresponding boundary images B2 and B3 may be displayed in the 2D cross-section image IM2, the 3D image IM3, and the side image IM4. Thus, the user may distinguish the seabed T2 more clearly.

Moreover according to this embodiment, the boundary B1 may include the straight line. According to this configuration, the setting of the boundary images B2 and B3 may be performed more easily in the 2D cross-section image IM2, the 3D image IM3, and the side image IM4.

The present disclosure is not limited to the above embodiment, and various changes may be possible within the scope described in the claims. For example, the following configurations may be adopted.

Figure 12A:
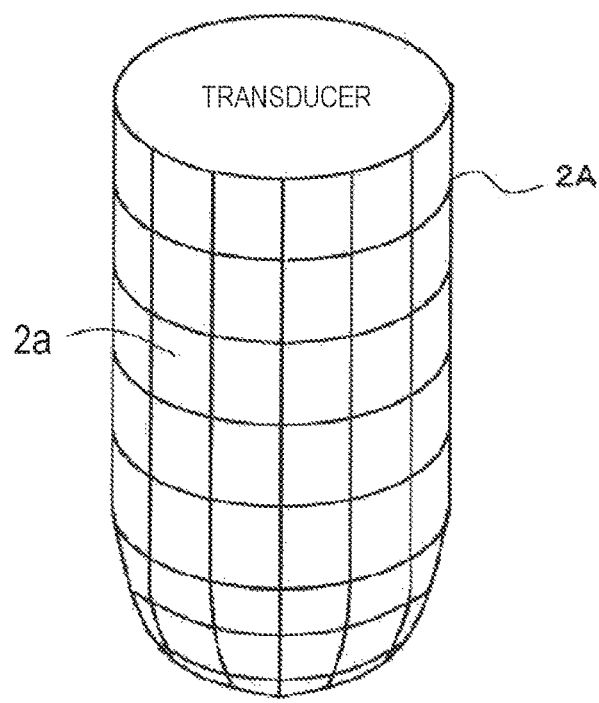
FIG. 12A is a view illustrating a modification of the transducer.
Figure 12B:
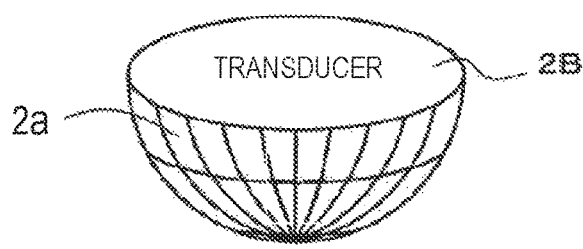
FIG. 12B is a view illustrating another modification of the transducer.
Figure 12C:
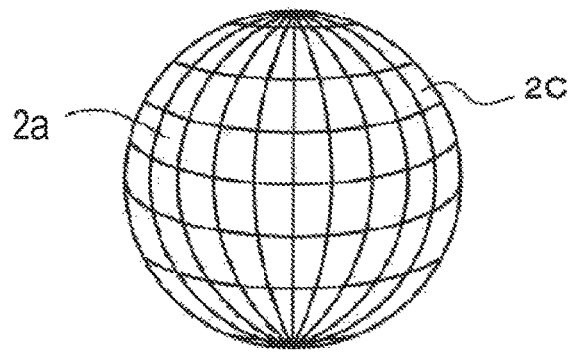
FIG. 12C is a view illustrating still another modification of the transducer.

(1) In the above embodiment, the acquisition modules 17 and 24 may obtain the water bottom depth WD from the fishfinder 31 or the user of the underwater detection apparatus 1. However, it may be such that, instead of the transducer 2, a transducer 2A indicated in FIG. 12A, a transducer 2B illustrated in FIG. 12B, or a transducer 2C illustrated in FIG. 12C may be used.

The transducer 2A may have a housing formed in a substantially cylindrical shape, with a lower part formed into a half spherical shape. Further, an outer circumferential surface and a half spherical surface of the housing may be attached with a plurality of ultrasonic transducers 2a. The transducer 2B may have a housing formed in a lower half spherical shape. Further, a half spherical surface of the housing may be attached with a plurality of ultrasonic transducers 2a. The transducer 2C may have a spherical housing. Further, an entire surface of the housing may be attached with a plurality of ultrasonic transducers 2a. According to such a structure, each of the transducers 2A to 2C may output the transmission wave straight below the ship S. Thus, the first acquisition module 17 of the scanning sonar 10 may measure the water bottom depth WD based at least on one of the first and second reception signals.

With this configuration, the underwater detection apparatus 1 may obtain the water bottom depth information without using the fishfinder 31.

(2) Moreover, in the above embodiment and modifications, the underwater detection apparatus 1 may obtain the water bottom depth WD from the fishfinder 31, one of the first and second reception signals received by the underwater detection apparatus 1, or the user of the underwater detection apparatus 1. However, it may be such that each of the boundary setting modules 18 and 25 sets the boundary B1 based on water bottom topography data acquired from an external information source different from the underwater detection apparatus 1, that is, the external information source different from the first and second reception signals. This water bottom topography data may be obtained by a third party mapping company etc. that measured the water bottom topography in advance. Moreover, the water bottom topography data may alternatively be generated by the image data generating modules 16 and 23 combining a plurality of underwater cross-section images obtained by operating the fishfinder 31 while the ship S travels.

Figure 13A:
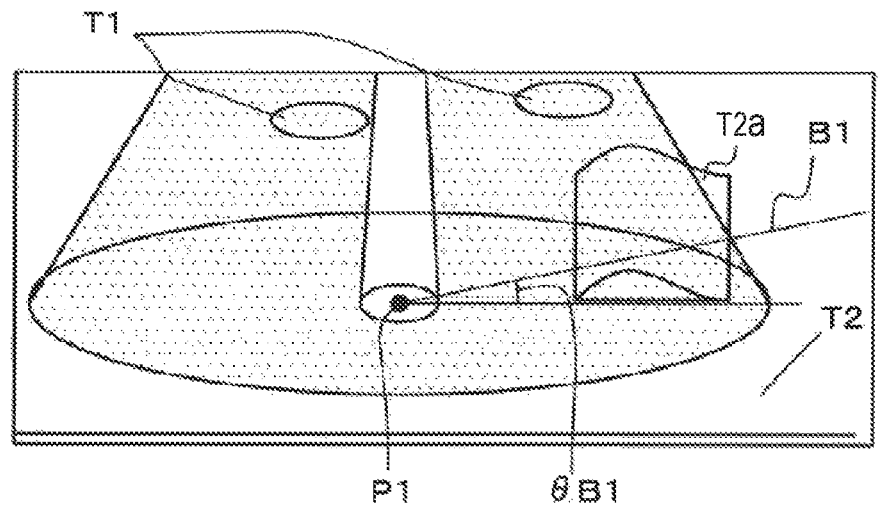
FIG. 13A is a schematic view illustrating a state where a seabed surface has an uneven part.
Figure 13B:
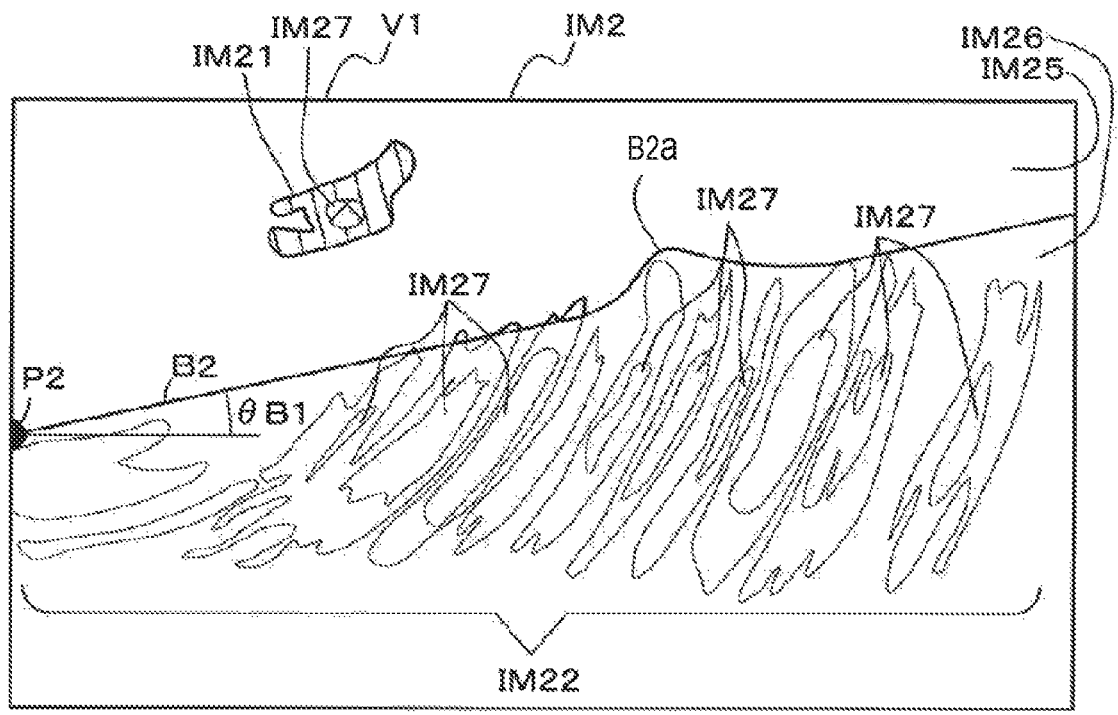
FIG. 13B shows a main portion of a 2D cross-section image corresponding to the seabed surface of FIG. 13A.
Figure 14:
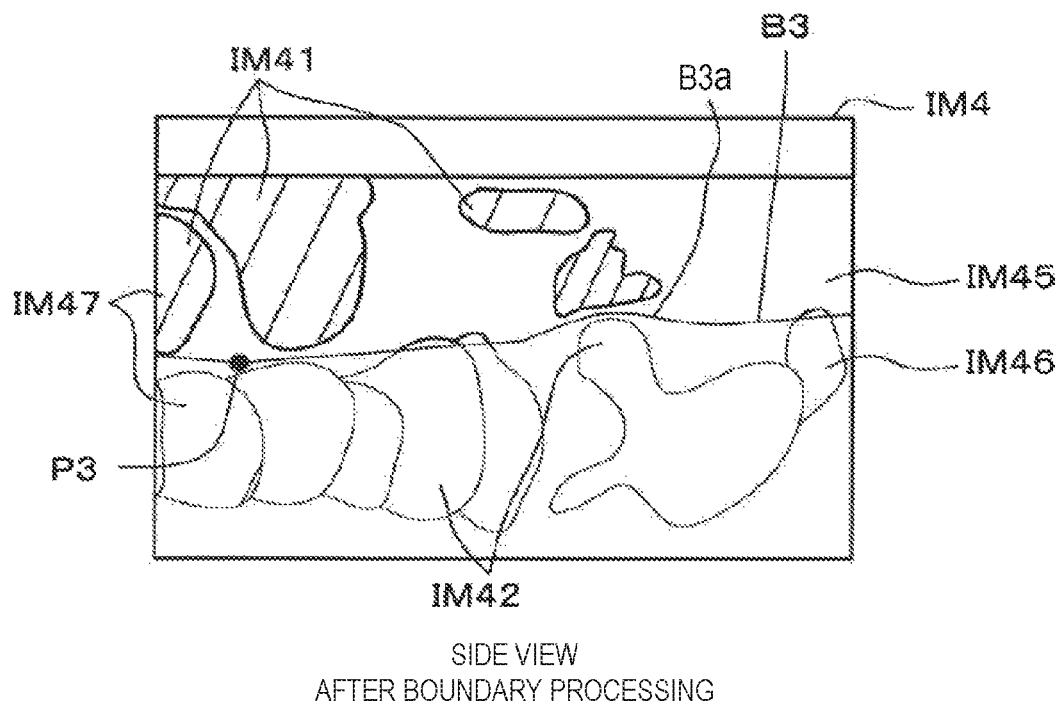
FIG. 14 shows a main portion of a 3D image and a main portion of a side image which correspond to the seabed surface illustrated in FIG. 13A.
Figure 14:
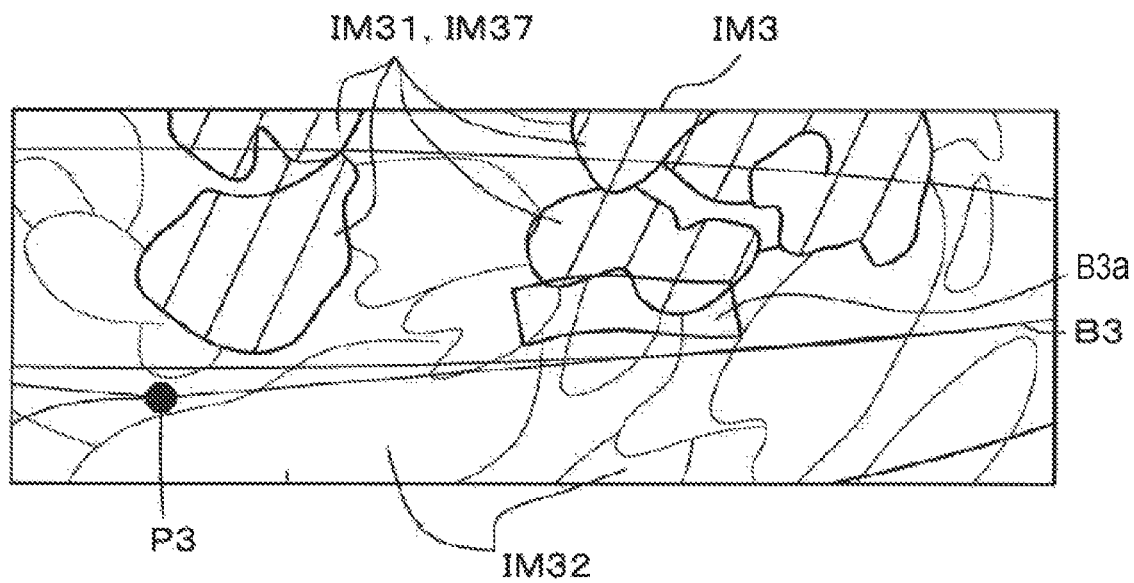

As described above, in the case the water bottom topography data is used, the boundary setting modules 18 and 25 may set the boundary B1 into a shape according to the water bottom topography. For example, as illustrated in FIG. 13A, when the seabed T2 (seabed surface) has an uneven portion T2a, the first image data generating module 16 may provide an uneven portion B2a having a shape corresponding to the uneven shape of the uneven portion T2a at a position corresponding thereto, in the boundary image B2 of the 2D cross-section image IM2, as illustrated in FIG. 13B. In this case, as illustrated in FIG. 14, the second image data generating module 23 may set an uneven portion B3a having a shape corresponding to the uneven shape of the uneven portion T2a at a position corresponding thereto, in the boundary image B3 having a substantially conical surface in the 3D image IM3. Moreover, the second image data generating module 23 may set an uneven portion B3a having a shape corresponding to the uneven shape of the uneven portion T2a at a position corresponding thereto, in the linearly-shaped boundary image B3 in the side image IM4.

According to such a configuration, the boundary B1 may be set more accurately according to the shape of the seabed T2.

(3) Further, in the above embodiment and modifications, in the boundary processing, the seabed echo images IM22, IM32 and IM42 located below the boundary images B2 and B3 may be set into a color other than gray, or deleted from the corresponding 2D cross-section image IM2, 3D image IM3 and side image IM4.

(4) Moreover, in the above embodiment and modifications, the configuration in which the 2D cross-section image data D2 may be generated using the first transmission wave and the 3D image data D3 may be generated using the second transmission wave is described. However, for example, the 2D cross-section image data D2 and the 3D image data D3 may be generated using one kind of transmission wave.

(5) Further, in the above embodiment and modifications, the example in which the processing device 5 may be the personal computer, formed separately from the transmission and reception device 3 is described. However, for example, the transmission and reception device 3 may contain part of or entire configuration of the processing device 5. In this case, the second display unit 6 may be omitted so that the first display unit 4 displays the contents displayed on the second display unit 6. Moreover, the operation performed by the second user-interface 29 may alternatively be performed by the first user-interface 28.

(6) Further, in the above embodiment and modifications, the example in which the image data generating modules 16 and 23 display a group of echoes with the same signal level in an isosurface is described. However, it may be such that an echo image is displayed by volume rendering. Here, the isosurface display and the volume rendering may be combined such that an upper part of the boundary images B2 and B3 (e.g., the school-of-fish echo images IM1, IM31 and IM41) is displayed by volume rendering and a lower part of the boundary images B2 and B3 (seabed echo images IM22, IM32 and IM42) is displayed by isosurface.

Figure 15:
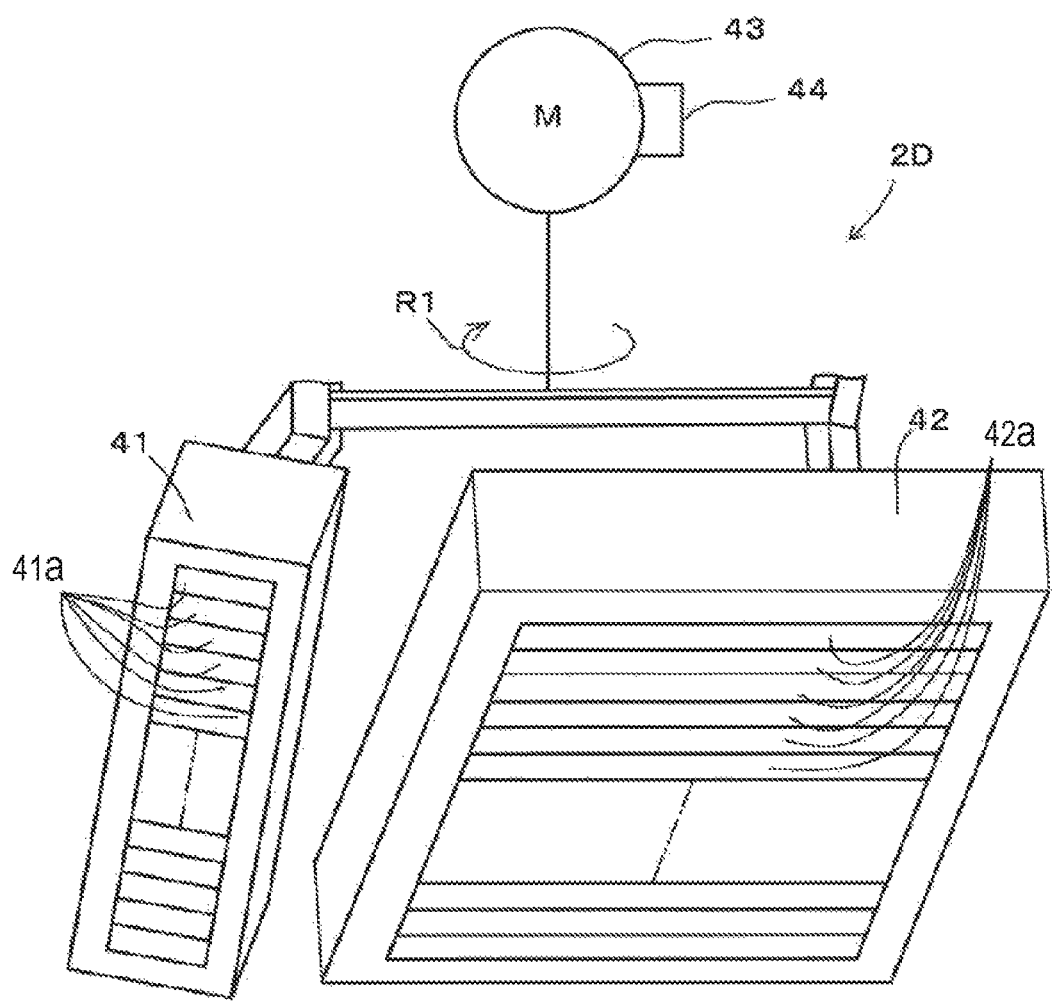
FIG. 15 is a view illustrating a main part of the present disclosure in further another modification.

(7) Further, in the above embodiment and modifications, the example of the scanning sonar in which the transducer 2 transmits and receives the signal in a steady state (i.e. no mechanical movement) with respect to the ship S is described. However, it may be such that a movable transducer 2D (i.e. having a mechanical movement) as illustrated in FIG. 15 is used as the transducer.

The transducer 2D may have a transmitter 41 (which may also be referred to as a transmission transducer), a receiver 42 (which may also be referred to as a reception transducer), a motor 43 as a rotational drive which rotates the transmitter 41 and the receiver 42, and a rotational angle detector 44.

Figure 16:
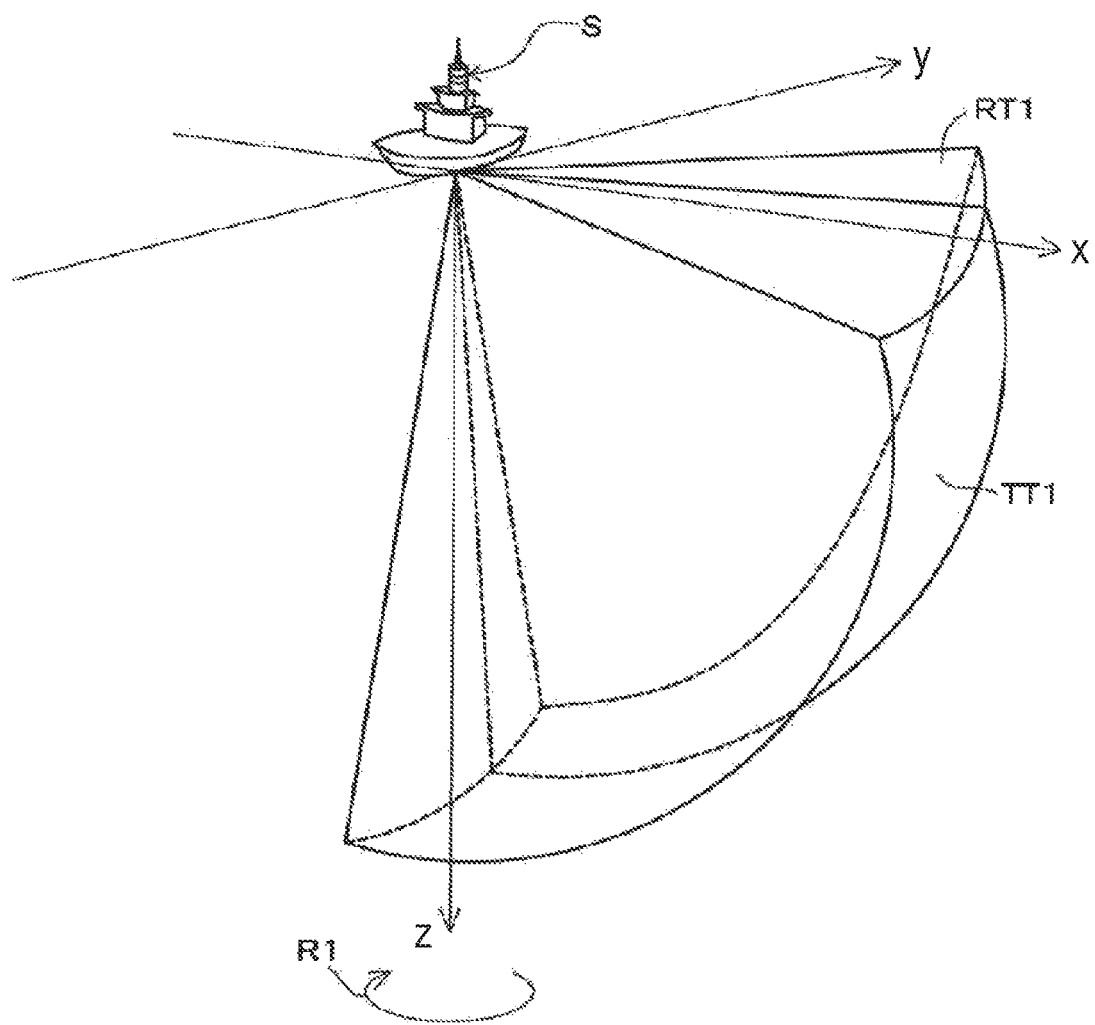
FIG. 16 is a view schematically illustrating a transmission beam and a reception beam formed by a transducer illustrated in FIG. 15.

FIG. 16 is a view schematically illustrating a transmission beam formed by the transmitter 41 and a reception beam formed by the receiver 42. As illustrated in FIGS. 15 and 16, the transmitter 41 may be provided to transmit the first and second transmission waves underwater. The transmitter 41 may have a configuration in which one or more transmission elements 41a as one or more ultrasonic transducers are attached to the housing. In this modification, the plurality of transmission elements 41a may be arranged substantially in line. That is, the transmitter 41 may be a linear array.

The receiver 42 may have a configuration in which one or more reception elements 42a as one or more ultrasonic transducers are attached to the housing. The receiver 42 may receive, as the reception wave, the reflection wave of each transmission pulse wave as the ultrasonic wave transmitted from the transmitter 41, and convert it into an echo signal as an electric signal. In this modification, the plurality of reception elements 42a may be arranged substantially in line. That is, the receiver 42 may be a linear array.

The transmitter 41 and the receiver 42 may integrally be rotated by the motor 43. In this modification, the motor 43 may drive the transmitter 41 and the receiver 42 in rotation by having a centre axis extending vertically as a rotational axis.

The motor 43 may be attached with the rotational angle detector 44. In this modification, angle positions of the transmitter 41 and the receiver 42 may be calculated based on the rotational angle of the motor 43 detected by the rotational angle detector 44.

The transmitter 41 may form a transmission fan-shaped area TT1 which is an area to which a 3D transmission beam as illustrated in FIG. 16 is outputted. The transmission fan-shaped area TT1 may be a fan beam area having substantially a fan shape.

The receiver 42 may receive a signal from a reception fan-shaped area RT1 as a 3D reception beam area as illustrated in FIG. 16. The reception fan-shaped area RT1 may substantially have a fan shape.

The motor 43 may rotate the transmission fan-shaped area TT1 and the reception fan-shaped area RT1 around the rotational axis of the motor 43. For example, the motor 43 may rotate the transmitter 41 and the receiver 42 to rotate the transmission fan-shaped area TT1 and the reception fan-shaped area RT1.

By the transmitter 41 and the receiver 42 rotating over the entire circumference of the motor 43 in the rotational axis, i.e., by forming the transmission fan-shaped area TT1 and receiving a signal in the reception fan-shaped area RT1 over the entire horizontal range, the image data generating modules 16 and 23 may obtain reception signals for generating the image data D2 and D3. That is, the transmission and reception device 3 may perform the beamforming on the signals obtained by the plurality of reception elements 42*a*, to generate the reception signals for generating the image data D2 and D3.

The present disclosure may broadly be applied as an underwater detection apparatus and an underwater detection method.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface". The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, movable, fixed, adjustable, and/or releasable connections or attachments. The connections/attachments can include direct connections and/or connections having intermediate structure between the two components discussed.

Unless otherwise explicitly stated, numbers preceded by a term such as "approximately", "about", and "substantially" as used herein include the recited numbers, and also represent an amount close to the stated amount that still performs a desired function or achieves a desired result. For example, unless otherwise explicitly stated, the terms "approximately", "about", and "substantially" may refer to an amount that is within less than 10% of the stated amount. Features of embodiments disclosed herein preceded by a term such as "approximately", "about", and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. An underwater detection apparatus, comprising:
a transmission and reception circuit configured to drive a transmission transducer to transmit a transmission wave and configured to generate a reception signal based on a reflection wave comprising a reflection of the transmission wave on an underwater target; and
processing circuitry configured to:
acquire a water bottom depth,
identify an oblique angle with respect to a horizontal plane passing in a horizontal direction through a point having a depth equal to the water bottom depth;
set a boundary line passing through the point and angled at the oblique angle with respect to the horizontal plane, and
generate an image data that represents a location of the underwater target based at least in part on the reception signal, the image data comprising a color information, the color information being set based at least in part on the location of the underwater target relative to the boundary line.

2. The underwater detection apparatus of claim 1, wherein:
the processing circuitry is further configured to adjust the oblique angle:
according to an instruction from a user of the underwater detection apparatus, or
based on a beam width of a beam formed to generate the reception signal.

3. The underwater detection apparatus of claim 1, wherein:

the processing circuitry is further configured to acquire the water bottom depth:
from an external information source different from the reception signal, or
by measuring the water bottom depth from the reception signal, or
from a user of the underwater detection apparatus.

4. The underwater detection apparatus of claim 1, wherein:
the processing circuitry is further configured to set the color information of the underwater target located deeper than the boundary line independently of the color information of the underwater target located shallower than the boundary line.

5. The underwater detection apparatus of claim 1, wherein:
the processing circuitry is further configured to set the color information independently of a signal level of the reception signal for the underwater target located deeper than the boundary line and having a signal level of the reception signal higher than a given threshold.

6. The underwater detection apparatus of claim 1, wherein:
the processing circuitry is further configured to:
generate a boundary image data that represents a location of the boundary line, and
add the boundary image data to the image data.

7. The underwater detection apparatus of claim 1, wherein:
the boundary line comprises a straight line.

8. The underwater detection apparatus of claim 1, wherein:
the processing circuitry is further configured to:
generate 3D data of the underwater target from the reception signal, and
generate the image data by projecting the 3D data on a 2D projection plane.

9. The underwater detection apparatus of claim 8, wherein:
the processing circuitry is further configured to:
generate 2D cross-section data of the underwater target from the reception signal,
generate 2D cross-section image data from the 2D cross-section data,
generate a boundary image data that represents a location of the boundary line,
add the boundary image data to the 2D cross-section image data, and
add the 2D cross-section image data to the image data.

10. The underwater detection apparatus of claim 1, wherein:
the processing circuitry is further configured to set the boundary line based on water bottom topography data acquired from an external information source different from the reception signal.

11. The underwater detection apparatus of claim 1, wherein:
the transmission and reception circuit generates the reception signal by receiving the reflection wave with a reception transducer comprising a plurality of reception elements and by performing beamforming on signals received by the plurality of reception elements.

12. An underwater detection method, comprising:
driving a transmission transducer to transmit a transmission wave;

generating a reception signal based on a reflection wave comprising a reflection of the transmission wave on an underwater target;

acquiring a water bottom depth;

identifying an oblique angle with respect to a horizontal plane passing in a horizontal direction through a point having a depth equal to the water bottom depth;

setting a boundary line passing through the point and angled at the oblique angle with respect to the horizontal plane; and generating an image data that represents a location of the underwater target based at least in part on the reception signal, the image data comprising a color information, the color information being set based at least in part on the location of the underwater target relative to the boundary line.

13. The underwater detection apparatus of claim 1, wherein the processing circuitry is further configured to automatically identify the oblique angle.

14. The underwater detection apparatus of claim 1, wherein the processing circuitry is further configured to identify the oblique angle based on information input by a user.

15. The underwater detection method of claim 12, wherein the identifying automatically identifies the oblique angle.

16. The underwater detection method of claim 12, wherein the identifying identifies the oblique angle based on information input by a user.

* * * * *